(12) United States Patent
Dodd et al.

(10) Patent No.: US 7,716,123 B2
(45) Date of Patent: May 11, 2010

(54) SYSTEMS AND METHODS FOR AUTOMATIC SUBMISSION, AUDIT AND ADJUSTMENT OF MORTGAGE INSURANCE CLAIMS

(75) Inventors: Nancy J. Dodd, Raleigh, NC (US);
Charla M. Parker, Raleigh, NC (US);
Allison N. Pope, Raleigh, NC (US);
Joanne A. Stewart, Raleigh, NC (US);
Traci L. Whitney, Raleigh, NC (US);
Robert Johnston, Wake Forest, NC (US)

(73) Assignee: GE Mortgage Holdings, LLC, Raleigh, NC (US)

( * ) Notice: Subject to any disclaimer, the term of this patent is extended or adjusted under 35 U.S.C. 154(b) by 1308 days.

(21) Appl. No.: 10/036,605

(22) Filed: Dec. 21, 2001

(65) Prior Publication Data
US 2003/0120588 A1 Jun. 26, 2003

(51) Int. Cl.
*G06Q 40/00* (2006.01)
(52) U.S. Cl. .......................................... 705/38; 705/39
(58) Field of Classification Search .................... 705/35, 705/38, 36, 39
See application file for complete search history.

(56) References Cited

U.S. PATENT DOCUMENTS 6,795,812 B1 * 9/2004 Lent et al. ..................... 705/38
7,379,912 B1 * 5/2008 Camin et al. .................. 705/38
2001/0044773 A1 * 11/2001 Sellers et al. .................. 705/38
2001/0056398 A1 * 12/2001 Scheirer ........................ 705/38
2004/0093242 A1 * 5/2004 Cadigan et al. ................ 705/4
2005/0262013 A1 * 11/2005 Guthner et al. ................ 705/38

OTHER PUBLICATIONS

Enhanced Claims Processing Capabilities Bolster First American Default Management Solutions, PR Newswire, New York, Nov. 21, 2001, p. 1, found on http://proquest,umi.com.*
Gwendolyn Glenn; "Loan Management Software Gets Warm Reception", Real Estate Finance Today, Feb. 8, 1999. vol. 16, Iss.5; p. 6.*

* cited by examiner

*Primary Examiner*—Jagdish N Patel
(74) *Attorney, Agent, or Firm*—Priest & Goldstein, PLLC

(57) ABSTRACT

Systems and methods are described for automatically processing mortgage insurance claims. In one described system, a central server computer receives inputs from, and provides outputs to, a servicer terminal connected into a network. The servicer terminal captures data from a servicer submitting a mortgage insurance claim. A claims database is connected into the network, containing data relating to the mortgage insurance claim. A claim audit rulebase is connected into the network, for automatically performing an audit and adjustment of the submitted mortgage insurance claim. The system automatically provides results of the audit and adjustment to the servicer at the servicer terminal, and presents the servicer with an option to interact with a claim representative to resolve any issues.

32 Claims, 48 Drawing Sheets

FIG. 8

*Claims on the Web - Coverage Validation - Microsoft Internet Explorer provided by GE Mortgage Insurance*

File Edit View Favorites Tools Help

*We bring good things to life.*

*GE Mortgage Insurance*

- View Claim Status
- Submit New Claim
- Contact GE Claim Rep
- Administration
  - Deductible
  - Expense
  - Pending Reason
  - State Detail
  - Zip Code Filter
  - Find/Delete Claim
- Help
- Logoff

Claims oon the Web - Coverage Validation

Enter one of the following criteria to search for coverage.

Certificate Number: [____] — 142
- OR -
Loan Number: [____] — 144
- OR -
Social Security Number: [____] — 146
- OR -
Borrower Last Name: [_____]
Borrower First Name: [_____] } 148

[Search] — 150

Copyright © 2000, GE Mortgage Insurance

FIG. 10A

```
Claims on the Web - Submit Claim - Microsoft Internet Explorer provided by GE Mortgage Insurance
File  Edit  View  Favorites  Tools  Help
```

We bring good things to life.

*GE Mortgage Insurance*

Claims on the Web - Submit Claim

Claim Status | Submit New Claim | Contact GE Claim Rep | Help | Logoff

Loan Information   Jump to Top | Interest Info | Expense Info | Deductible Items | Comments | Additional Info | Bottom

| 1. Insurance Type: | 2. Claim Type: | |
|---|---|---|
| Primary | Initial | 172 |
| 3. Mortgage Insurance Company Name: | 4. Date Claim Submitted | 5. Date Claim Received. |
| GE Mortgage Insurance Corporation | 10/29/2001 | 10/29/2001 |
| 6. Mortgage Insurance Company Address: | 7. Mortgage Insurer Telephone Number: | |
| 6601 Six Forks Road Raleigh NC 27615 | (800) 334-9270 | |
| 8. Certificate Number: | 9. Master Policy Number | |
| 1234567890 | 0000000000 | |
| 10. Borrower Name(s) | 11. % Coverage. 170 | 12. Type Coverage |
| Joe Smith | 30 | ST |

13. Property Address
Street: 123 Anywhere Street
City: Raleigh    State: NC    Zip Code: 27615

14. Servicer Name: Abc Bank    15. Servicer Loan Number: 123456

16. Servicer Address
Street: 1000 America Boulevard
Suite 300
City: Raleigh    State: NC    Zip Code: 276151234

17. Payee: (Choose one)

```
Claims on the Web - Submit Claim - Microsoft Internet Explorer provided by GE Mortgage Insurance
File  Edit  View  Favorites  Tools  Help
```

17. Payee: (Choose one)
○ Servicer        (same address as above)
⦿ Fannie Mae      (will be wired directly)   Loan Number [8888888888]
○ Freddie Mac     (will be wired directly)   Loan Number [        ]
○ Other
  Name:         [                              ]
  Loan Number:  [            ]
  Street:       [                                      ]
                [                                      ]
  City:         [                          ]  State: [  ]  Zip Code [    ]

— 162

Interest Information     Jump to Top | Loan Info | Expense Info | Deductible Items | Comments | Additional Info | Bottom 18 Unpaid Principal Balance: $ [46443.00] — 182
19 Accumulated Interest:                           196

Note Rate(%)      From Date       To Date           # of Days                    Amount
[                                                                                      ]

Note Rate [    ]%      From Date [    ] (mm/dd/yyyy)        To Date [    ] (mm/dd/yyyy)
          192                188  [Add] [Modify] [Delete]              190
                                                                                         — 180

• To Add a new row, enter the Interest Rate, the From Date, and the To Date and click the Add button.
• To Modify an existing row,
    ○ IE users: double-click on the row you want to modify. The input boxes will be filled with the information for that row. Make the necessary changes and click the Modify button
    ○ Netscape users: single-click on the row you want to modify and click the Modify button. The input boxes will be filled with the information for that row. Make the necessary changes and click the Modify button
• To Delete an existing row, single-click on the row you want to delete. The row will be highlighted. Click the Delete button
                                                                                        198
                                              Accumulated Interest Total: $ [0.00]

FIG. 10C

*Claims on the Web - Submit Claim - Microsoft Internet Explorer provided by GE Mortgage Insurance*

File Edit View Favorites Tools Help

Expense Information   Jump to Top | Loan Info | Interest Info | Deductible Items | Comments | Additional Info | Bottom 20. Expenses  210
Cat Item      Date Paid    Effective Start   Effective End      Monthly Amt         Amount

212

Item [Abandoned Car Removal ▼]                Effective Start Date: [ ]   ☐ Required
Date Paid [       ] (mm/dd/yyyy)              Effective End Date:   [ ]   ☐ Required
Amount    [       ]                           Monthly Payment Amount: [ ] ☐ Required
              206        202
204                 208   [Add] [Modify] [Delete]      214  216

• To Add a new row, enter the Interest Rate, the From Date, and the To Date and click the Add button.
• To Modify an existing row,
    ○ IE users: double-click on the row you want to modify. The input boxes will be filled with the information for that row. Make the necessary changes and click the Modify button.
    ○ Netscape users: single-click on the row you want to modify and click the Modify button. The input boxes will be filled with the information for that row. Make the necessary changes and click the Modify button
• To Delete an existing row, single-click on the row you want to delete. The row will be highlighted. Click the Delete button Attorney's Fees Total:        $ [0    ]    Property Taxes Total:           $ [0    ]
Hazard Insurance Premiums    $ [0    ]    Property Preservation Costs     $ [0    ]
Total:                                     Total:
Statutory Disbursements      $ [0    ]    Other Disbursements Total:      $ [0    ]
Total Expense Total: $ [0.00  ]

Deductible Items    Jump to Top | Loan Info | Interest Info | Expense Info | Comments | Additional Info | Bottom 21. Escrow Account Balance.
    (This balance should be positive, expenses paid after default
    should be listed in the Expense Information section above.)       $ [0.00   ]

| | | |
|---|---|---|
| 22. Net Rental Proceeds: | $ 0.00 | |
| 23. Pledge Savings, Buydowns, or Other Funds Held for Insured: | $ 0.00 | |
| 24. Insurance Proceeds: | $ 0.00 | |
| 25. Hazard Insurance Refund: | $ 0.00 | |
| 26. Cash Contribution: | $ 0.00 | |
| 27. Other Deductions(e.g. unapplied bankruptcy payments, etc.) | $ 0.00 | |
| 28. Deductible Items Total | | $ 0.00 |
| 29. Total Claim Amount | | $ 46,443.00 |
| 30. Less Adjustments (Net Proceeds Received from Sale of Property)   Presale Date: [mm/dd/yyyy] | | $ 0.00 |
| 31. Adjusted Claim Amount | | $ 46,443.00 |

32. Comments: (Any comments entered here will require a manual review.)

Property Value Information

33. Current Market Value: $ 38,000.00   Value Date
    Servicer/Investor Value $ 38,000.00   Value Date. [mm/dd/yyyy]

Access Information

34. Is property ○ vacant ○ occupied ○ unknown ?
    Key to property may be obtained from: ___   Telephone: ___

Additional Information

Jump to Top | Loan Info | Interest Info | Expense Info | Deductible Items | Comments | Bottom

FIG. 10E

```
35 Additional dates
   Loan Due Date:              [04/01/1999]  (mm/dd/yyyy)
   Foreclosure Start Date      [05/31/2000]  (mm/dd/yyyy)      ⎫
   Foreclosure Sale Date:      [09/04/2001]  (mm/dd/yyyy)      ⎬ — 280
   Lender Acquired Title Date. [09/04/2001]  (mm/dd/yyyy)      ⎭

36 Bankruptcy Dates (most recent first)
   Bankruptcy Filed Date:     Bankruptcy Discharged Date:   Foreclosure Restart Date.
   1. [05/14/1999] (mm/dd/yyyy)   [          ] (mm/dd/yyyy)    [          ] (mm/dd/yyyy)
   2. [          ] (mm/dd/yyyy)   [          ] (mm/dd/yyyy)    [          ] (mm/dd/yyyy)
   3. [          ] (mm/dd/yyyy)   [          ] (mm/dd/yyyy)    [          ] (mm/dd/yyyy)
```

Claims Authorization and Submission

Jump to Top | Loan Info | Interest Info | Expense Info | Deductible Items | Comments | Additional Info

*I hereby certify that the statements contained herein are true, correct and complete. I understand that a claim will not be complete until all applicable documents have been received by the Insurer. We are not aware of any facts indicating that the subject property is or might be subject to any environmental contamination or hazard, except as disclosed in accompanying attachments.*

Submitter's Name:           Jane M. Smith
Submitter's Title/Department: Claims Specialist
Contact Name:               [Jane M Smith]
Contact Phone:              [(555) 555-1212]
Contact Email.              [jane_m_smith@abcbank.com]

[Submit Claim] [Cancel]

For your protection California law requires the following to appear on this form: ANY PERSON WHO KNOWINGLY PRESENTS A FALSE OR FRAUDULENT CLAIM FOR PAYMENT OF A LOSS IS GUILTY OF A CRIME AND MAY BE SUBJECT TO FINES AND CONFINEMENT IN STATE PRISON.

The following statement applies to insured parties residing in and to those who make claims with respect to insured loans secured by properties located in New Jersey: ANY PERSON WHO KNOWINGLY AND WITH THE INTENT TO DEFRAUD ANY INSURANCE COMPANY OR OTHER PERSON FILES AN APPLICATION FOR INSURANCE OR STATEMENT OF CLAIM CONTAINING ANY MATERIALLY FALSE

```
Claims on the Web - Audit Results - Microsoft Internet Explorer provided by GE Mortgage Insurance
File  Edit  View  Favorites  Tools  Help
```

We bring good things to life.

GE Mortgage Insurance

| View Claim Status |
| Submit New Claim |
| Contact GE Claim Rep |
| Administration |
| Deductible |
| Expense |
| Pending Reason |
| State Detail |
| Zip Code Filter |
| Find/Delete Claim |
| Help |
| Logoff |

Claims on the Web - Audit Results

Thank You for using GE Claims on the Web.

You can expect your payment no later than 11/06/2001 *
Payment may be delayed if we have not received all required information from you.
Your claim requires Claim Representative review Borrower Name: Joe Smith
Property Address: 123 Anywhere Street
                  Raleigh NC 27615
Lender Loan Number: 123456
Certificate Number: 1234567890
Claim Submit Date: 10/29/2001          — 324
Claim Type: Initial                    — 326
Claim Status: Pending                                              328

| Claim For Loss Section Adjusted | Adjustment Reason | Adjustment Amount |
|---|---|---|
| RuleInfo | BOV Value used for rule calculations was 38000.00 | 0.00 |
| RuleInfo | Audit disposition description set to Pay Claim | 0.00 |
| Mkt Value | Requires claim rep review due to market value variance. | 0.00 |
| Interest | Interest was adjusted from 6/1/2001 to 9/3/2001 for the amount of 989.82 due to lengthy foreclosure | -989.82 |
| Interest | MPV F. Interest not adjusted because a bankruptcy was filed prior to the foreclosure starting | 0.00 |
| Expense | The expense item Bankruptcy Costs of 203.50 has been adjusted to the normal and customary amount of 200.00 | -3.50 |
| Expense | The expense item Boarding of 307.06 has been adjusted to the normal and customary amount of 100.00 | -207.06 |
| Expense | Effective dates not provided for Hazard Insurance. | 0.00 |
| Expense | Effective dates not provided for Taxes - County. | 0.00 |
| | Total of Adjustments | -1,200.38 |

⟩ 322

[ Review EOB ]   [ View Claim ]   [ Edit Originals ]

| | | |
|---|---|---|
| Net Sales Proceeds | $0.00 | $0.00 |
| Restoration Amount | | $0.00 |
| Loss Amount | | $60,372.81 | ← 346 |
| | | |
| Percent Coverage | | 30% |
| Guaranty Amount | | $18,111.84 | ← 348 |
| | | |
| Net Claim | | $18,111.84 | ← 350 |
| | | |
| Partial Claim Advance | | $0.00 |
| Advance Claim Payment | | $0.00 |
| Preliminary Claim Payment | | $0.00 |
| Unamortized Financed Premium | | $0.00 |
| Premium Due | | $0.00 |
| Additional Interest | | $0.00 |
| Late Interest | | $0.00 |
| Preliminary Claim | | $18,111.84 | ← 352 |

Reasons for Adjustments

1. Requires claim rep review due to market value variance.
2. Interest was adjusted from 6/1/2001 to 9/3/2001 for the amount of 989.82 due to lengthy foreclosure.
3. The expense item Bankruptcy Costs of 203.50 has been adjusted to the normal and customary amount of 200.00
4. The expense item Boarding of 307.06 has been adjusted to the normal and customary amount of 100.00
5. Effective dates not provided for Hazard Insurance.
6. Effective dates not provided for Taxes - County.

→ 354

Interval Calculations

| From Date | To Date | Principal | Days | Rate | Per Diem | Interest |
|---|---|---|---|---|---|---|
| 03/01/1999 | 05/31/2001 | $46,443.36 | 811 | 8.25% | $10.64 | $8,631.69 |
| 09/04/2001 | 10/15/2001 | $46,443.36 | 42 | 8.25% | $10.64 | $447.02 |

→ 356

Event Dates

Paid To: 03/01/1999    Bankruptcy File 1: 05/14/1999
Foreclosure Start: 05/31/2000    Bankruptcy Release 1:

```
Claims on the Web - Preliminary Explanation of Benefits - Microsoft Internet Explorer provided by GE Mortgage Insurance
File  Edit  View  Favorites  Tools  Help
```

| | |
|---|---|
| Partial Claim Advance | $0.00 |
| Advance Claim Payment | $0.00 |
| Preliminary Claim Payment | $0.00 |
| Unamortized Financed Premium | $0.00 |
| Premium Due | $0.00 |
| Additional Interest | $0.00 |
| Late Interest | $0.00 |
| Preliminary Claim | $18,111.84 |

— 352

Reasons for Adjustments

1. Requires claim rep review due to market value variance.
2. Interest was adjusted from 6/1/2001 to 9/3/2001 for the amount of 989.82 due to lengthy foreclosure.
3. The expense item Bankruptcy Costs of 203.50 has been adjusted to the normal and customary amount of 200.00
4. The expense item Boarding of 307.06 has been adjusted to the normal and customary amount of 100.00
5. Effective dates not provided for Hazard Insurance.
6. Effective dates not provided for Taxes - County

⎫
⎬ 354
⎭

Interval Calculations

| From Date | To Date | Principal | Days | Rate | Per Diem | Interest |
|---|---|---|---|---|---|---|
| 03/01/1999 | 05/31/2001 | $46,443.36 | 811 | 8.25% | $10.64 | $8,631.69 |
| 09/04/2001 | 10/15/2001 | $46,443.36 | 42 | 8.25% | $10.64 | $447.02 |

⎫ 356
⎭

Event Dates

| | |
|---|---|
| Paid To: 03/01/1999 | Bankruptcy File 1: 05/14/1999 |
| Foreclosure Start: 05/31/2000 | Bankruptcy Release 1: |
| Foreclosure Sale: 09/04/2001 | Bankruptcy File 2: |
| Foreclosure Restart 1: | Bankruptcy Release 2 |
| Foreclosure Restart 2: | Bankruptcy File 3: |
| Foreclosure Restart 3: | Bankruptcy Release 3: |
| Lender Acquire Title: 09/04/2001 | Claim Submittal: 10/29/2001 |

⎫ 358
⎭

Copyright © 2000, GE Mortgage Insurance

```
Claims on the Web - View Claim - Microsoft Internet Explorer provided by GE Mortgage Insurance
File  Edit  View  Favorites  Tools  Help
```

18 Unpaid Principal Balance  $ 46,443.36
19 Accumulated Interest.

| Note Rate(%) | From Date | To Date | # of Days | Amount |
|---|---|---|---|---|
| 8 25 | 03/01/1999 | 10/15/2001 | 945 | 10,057.89 |

Accumulated Interest Total: $ 10,057.89

Expense Information     Jump to Top | Loan Info | Interest Info | Deductible Items | Comments | Additional Info | Bottom 20 Expenses.

| Cat | Item | Date Paid | Effective Start | Effective End | Monthly Amt | Amount |
|---|---|---|---|---|---|---|
| AF | Attorney Fees | 09/04/2001 | | | | 750.00 |
| AF | Bankruptcy Attorney Fees | 10/28/1999 | | | | 800.00 |
| HI | Hazard Insurance | 12/23/1999 | | | | 814.00 |
| HI | Hazard Insurance | 09/18/2001 | | | | 73.00 |
| PP | BPO | 09/06/2001 | | | | 85.00 |
| PP | Lock Change | 03/22/2000 | | | | 60.00 |
| PP | Winterization | 03/22/2000 | | | | 125.00 |
| PP | Yard Care | 06/28/2001 | | | | 150.00 |
| PT | Boarding | 03/22/2000 | | | | 25.00 |
| PT | Boarding | 09/04/2001 | | | | 307.06 |
| PT | Taxes - County | 10/13/1999 | | | | 272.71 |
| PT | Taxes - County | 04/11/2000 | | | | 283.83 |
| PT | Taxes - County | 10/16/2000 | | | | 283.83 |
| PT | Taxes - County | 04/06/2001 | | | | 577.21 |
| SD | Attorney Out-Of-Pocket | 09/04/2001 | | | | 175.99 |
| SD | Attorney Out-Of-Pocket | 09/04/2001 | | | | 183.18 |
| SD | Attorney Out-Of-Pocket | 09/04/2001 | | | | 283.00 |
| SD | Bankruptcy Costs | 10/28/1999 | | | | 203.50 |

| | | | | |
|---|---|---|---|---|
| Attorney's Fees Total: | $ 1,550.00 | Property Taxes Total: | | $ 1,749.64 |
| Hazard Insurance Premiums Total: | $ 887.00 | Property Preservation Costs Total. | | $ 420.00 |
| Statutory Disbursements Total. | $ 845.66 | Other Disbursements Total: | | $ 0.00 |

Expense Total: $ 5,452.30

Deductible Items     Jump to Top | Loan Info | Interest Info | Expense Info | Comments | Additional Info | Bottom 21 Escrow Account Balance·

```
Claims on the Web - View Claim - Microsoft Internet Explorer provided by GE Mortgage Insurance
File  Edit  View  Favorites  Tools  Help
```

21. Escrow Account Balance
(This balance should be positive, expenses paid after default
should be listed in the Expense Information section above )                          $ 0.00

22. Net Rental Proceeds.                                                              $ 0.00

23. Pledge Savings, Buydowns, or Other Funds Held for Insured:                        $ 0.00

24. Insurance Proceeds:                                                               $ 0.00

25. Hazard Insurance Refund:                                                          $ 0.00

26. Cash Contribution:                                                                $ 0.00

27. Other Deductions (e.g. unapplied bankruptcy payments, etc ):                      $ 391.00

28. Deductible Items Total                                                                      $ 391.00

29. Total Claim Amount                                                                          $ 61,562.55

30. Less Adujustments
    (Net Proceeds Received from Sale of Property)   Presale Date.                               $ 0.00

31. Adjusted Claim Amount                                                                   $ 61,562.55

32. Comments. (Any comments entered here will require a manual review )

Property Value Information

33. Current Market Value:     $ 38,000.00     Value Date:

Servicer/Investor Value   $ 55,900.00     Value Date-    08/28/2001

Access Information

34. Property status: Unknown

Key to property may be obtained from-              Telephone:

Additional Information                Jump to Top | Loan Info | Interest Info | Expense Info | Deductible Items | Comments | Bottom 35. Additional dates Loan Due Date:              04/01/1999

Foreclosure Start Date:     05/31/2000

Foreclosure Sale Date.      09/04/2001

Lender Acquired Title Date: 09/04/2001

36. Bankruptcy Dates (most recent first)

Bankruptcy Filed Date-    Bankruptcy Discharged Date:    Foreclosure Restart Date-

```
Claims on the Web - View Claim - Microsoft Internet Explorer provided by GE Mortgage Insurance
File  Edit  View  Favorites  Tools  Help
```

Bankruptcy Filed Date.    Bankruptcy Discharged Date-    Foreclosure Restart Date
1  05/14/1999
2
3.

Claims Authorization and Submission    Jump to Top | Loan Info | Interest Info | Expense Info | Deductible Items | Comments | Additional Info

*I hereby certify that the statements contained herein are true, correct and complete. I understand that a claim will not be complete until all applicable documents have been received by the insurer. We are not aware of any facts indicating that the subject property is or might be subject to any environmental contamination or hazard, except as disclosed in accompanying attachments.*

Submitters's Name:            Unavailable
Submitters's Title/Department  Unavailable
Contact Name:                 Jane M. Smith
Contact Phone:                (555) 555-1212
Contact Email                 jane_m_smith@abcbank.com For your protection California law requires the following to appear on this form: ANY PERSON WHO KNOWINGLY PRESENTS A FALSE OR FRAUDULENT CLAIM FOR PAYMENT OF A LOSS IS GUILTY OF A CRIME AND MAY BE SUBJECT TO FINES AND CONFINEMENT IN STATE PRISON.

The following statement applies to insured parties residing in and to those who make claims with respect to insured loans secured by properties located in New Jersey: ANY PERSON WHO KNOWINGLY AND WITH THE INTENT TO DEFRAUD ANY INSURANCE COMPANY OR OTHER PERSON FILES AN APPLICATION FOR INSURANCE OR STATEMENT OF CLAIM CONTAINING ANY MATERIALLY FALSE INFORMATION, OR CONCEALS, FOR THE PURPOSE OF MISLEADING, INFORMATION CONCERNING ANY FACT MATERIAL THERETO, COMMITS A FRAUDULENT INSURANCE ACT, WHICH IS A CRIME.

Other jurisdictions have laws that apply to insured parties and to those who make claims with respect to properties located in their respective areas which: MAKE IT A CRIME FOR PERSONS WHO KNOWINGLY AND WITH INTENT TO INJURE, DEFRAUD OR DECEIVE ANY INSURANCE COMPANY TO FILE A STATEMENT OF CLAIM CONTAINING FALSE, INCOMPLETE OR MISLEADING INFORMATION. SUCH PERSONS ARE SUBJECT TO PROSECUTION AND PUNISHMENT FOR INSURANCE FRAUD. PENALTIES MAY INCLUDE FINES AND/OR IMPRISONMENT.

Among these jurisdictions are: Alaska, Delaware, Florida, Idaho, Indiana, Nevada, New Hampshire, New York and Ohio.

Copyright © 2000, GE Mortgage Insurance

```
Claims on the Web - Edit Originals - Microsoft Internet Explorer provided by GE Mortgage Insurance
File  Edit  View  Favorites  Tools  Help
```

17 Payee: (Choose one)
- ○ Servicer       (same address as above)                              Claim Ack Org:      [B222224C9F]
- ● Fannie Mae    (will be wired directly)  Loan Number [8888888888]   Claim Ack Addr ID:  [CLAIMS03]
- ○ Freddie Mac   (will be wired directly)  Loan Number [         ]   Payee Org:          [0000571943]
- ○ Other                                                              Payee Addr ID:      [CLAIMS]

Name: [                              ]
Loan Number: [      ]
Street: [                                        ]
        [                                        ]
City: [                                  ]  State [  ]  Zip Code [    ]

Interest Information     Jump to Top | Loan Info | Expense Info | Deductible Items | Comments | Additional Info | Bottom 18. Unpaid Principal Balance: $ [46443.36]
19. Accumulated Interest:

| Note Rate(%) | From Date  | To Date    | # of Days | Amount    |
|--------------|------------|------------|-----------|-----------|
| 8.25         | 03/01/1999 | 10/15/2001 | 945       | 10,057.89 |

Note Rate: [    ] %   From Date [        ] (mm/dd/yyyy)   To Date: [        ] (mm/dd/yyyy)

[Add] [Modify] [Delete]

- To Add a new row, enter the Interest Rate, the From Date, and the To Date and click the Add button.
- To Modify an existing row,
  ○ IE users: double-click on the row you want to modify. The input boxes will be filled with the information for that row. Make the necessary changes and click the Modify button.
  ○ Netscape users: single-click on the row you want to modify and click the Modify button. The input boxes will be filled with the information for that row. Make the necessary changes and click the Modify button.
- To Delete an existing row, single-click on the row you want to delete. The row will be highlighted. Click the Delete button.

Accumulated Interest Total: $ [10,057.89]

```
Claims on the Web - Edit Originals - Microsoft Internet Explorer provided by GE Mortgage Insurance
File  Edit  View  Favorites  Tools  Help
```

Accumulated Interest Total: $ [10,057.89]

Expense Information   Jump to Top | Loan Info | Interest Info | Deductible Items | Comments | Additional Info | Bottom 20 Expenses:

| Cat | Item | Date Paid | Effective Start | Effective End | Monthly Amt | Amount |
|-----|------|-----------|-----------------|---------------|-------------|--------|
| AF | Attorney Fees | 09/04/2001 | | | | 750.00 |
| AF | Bankruptcy Attorney Fees | 10/28/1999 | | | | 800.00 |
| HI | Hazard Insurance | 12/23/1999 | | | | 814.00 |
| HI | Hazard Insurance | 09/18/2001 | | | | 73.00 |
| PP | BPO | 09/06/2001 | | | | 85.00 |

Item: [Abandoned Car Removal ▼]   Effective Start Date [ ]   ☐ Required
Date Paid: [10/28/1999] (mm/dd/yyyy)   Effective End Date. [ ]   ☐ Required
Amount [ ]   Monthly Payment Amount [ ]   ☐ Required

[Add]  [Modify]  [Delete]

- To Add a new row, enter the Interest Rate, the From Date, and the To Date and click the Add button
- To Modify an existing row,
    - IE users: double-click on the row you want to modify. The input boxes will be filled with the information for that row. Make the necessary changes and click the Modify button
    - Netscape users: single-click on the row you want to modify and click the Modify button. The input boxes will be filled with the information for that row. Make the necessary changes and click the Modify button
- To Delete an existing row, single-click on the row you want to delete. The row will be highlighted. Click the Delete button.

Attorney's Fees Total   $ [1,550.00]   Property Taxes Total:   $ [1,749.64]
Hazard Insurance Premiums Total:   $ [887.00]   Property Preservation Costs Total:   $ [420.00]
Statutory Disbursements Total:   $ [845.66]   Other Disbursements Total:   $ [0]

Expense Total: $ [5,452.30]

Deductible Items   Jump to Top | Loan Info | Interest Info | Expense Info | Comments | Additional Info | Bottom 21 Escrow Account Balance:

FIG. 14D

```
Claims on the Web - Edit Originals - Microsoft Internet Explorer provided by GE Mortgage Insurance
File  Edit  View  Favorites  Tools  Help
```

(This balance should be positive, expenses paid after default
should be listed in the Expense Information section above.)                    $ [0.00]

22. Net Rental Proceeds:                                                        $ [0.00]

23. Pledge Savings, Buydowns, or Other Funds Held for Insured·                 $ [0.00]

24. Insurance Proceeds:                                                         $ [0.00]

25. Hazard Insurance Refund:                                                    $ [0.00]

26. Cash Contribution.                                                          $ [0.00]

27. Other Deductions(e.g. unapplied bankruptcy payments, etc.)·                $ [391.00]

28. Deductible Items Total                                              $ [391.00]

29. Total Claim Amount                                                  $ [61,562.55]

30. Less Adjustments
    (Net Proceeds Received from Sale of Property)   Presale Date: [         ] (mm/dd/yyyy)   $ [0.00]

31. Adjusted Claim Amount                                           $ [61,562.55]

32. Comments. (Any comments entered here will require a manual review.)
    [                                                                                    ]

Property Value Information

33. Current Market Value·      $ 38,000.00      Value Date:
    Servicer/Investor Value·   $ [55,900.00]    Value Date·  [08/28/2001] (mm/dd/yyyy)

Access Information

34. Is property   ○ vacant   ○ occupied   ○ unknown ?
    Key to property may be obtained from:                   Telephone.
    [                                    ]                  [            ]

Claims on the Web - Edit Originals - Microsoft Internet Explorer provided by GE Mortgage Insurance File  Edit  View  Favorites  Tools  Help

Additional Information  Jump to Top | Loan Info | Interest Info | Expense Info | Deductible Items | Comments | Bottom 35. Additional dates Loan Due Date: 04/01/1999 (mm/dd/yyyy)

Foreclosure Start Date: 05/31/2000 (mm/dd/yyyy)

Foreclosure Sale Date: 09/04/2001 (mm/dd/yyyy)

Lender Acquired Title Date: 09/04/2001 (mm/dd/yyyy)

36. Bankruptcy Dates (most recent first)

| Bankruptcy Filed Date: | Bankruptcy Discharged Date: | Foreclosure Restart Date: |
|---|---|---|
| 1. 05/14/1999 (mm/dd/yyyy) | (mm/dd/yyyy) | (mm/dd/yyyy) |
| 2. (mm/dd/yyyy) | (mm/dd/yyyy) | (mm/dd/yyyy) |
| 3. (mm/dd/yyyy) | (mm/dd/yyyy) | (mm/dd/yyyy) |

Claims Authorization and Submission  Jump to Top | Loan Info | Interest Info | Expense Info | Deductible Items | Comments | Additional Info

*I hereby certify that the statements contained herein are true, correct and complete. I understand that a claim will not be complete until all applicable documents have been received by the insurer. We are not aware of any facts indicating that the subject property is or might be subject to any environmental contamination or hazard, except as disclosed in accompanying attachments.*

Submitter's Name: Unavailable
Submitter's Title/Department: Unavailable
Contact Name: Jane M. Smith
Contact Phone: (555) 555-1212
Contact Email: jane_m.smith@abcbank.com

[Submit Claim]  [Cancel]

For your protection California law requires the following to appear on this form: ANY PERSON WHO KNOWINGLY PRESENTS A FALSE OR FRAUDULENT CLAIM FOR PAYMENT OF A LOSS IS GUILTY OF A CRIME AND MAY BE SUBJECT TO FINES AND CONFINEMENT IN STATE PRISON.

```
Claims on the Web - Edit Originals - Microsoft Internet Explorer provided by GE Mortgage Insurance
File  Edit  View  Favorites  Tools  Help
```

Claims Authorization and Submission   Jump to Top | Loan Info | Interest Info | Expense Info | Deductible Items | Comments | Additional Info

*I hereby certify that the statements contained herein are true, correct and complete. I understand that a claim will not be complete until all applicable documents have been received by the insurer. We are not aware of any facts indicating that the subject property is or might be subject to any environmental contamination or hazard, except as disclosed in accompanying attachments.*

| | |
|---|---|
| Submitter's Name: | Unavailable |
| Submitter's Title/Department: | Unavailable |
| Contact Name: | Jane M. Smith |
| Contact Phone: | (555) 555-1212 |
| Contact Email: | jane.m.smith@abcbank.com |

[ Submit Claim ]  [ Cancel ]

For your protection California law requires the following to appear on this form: ANY PERSON WHO KNOWINGLY PRESENTS A FALSE OR FRAUDULENT CLAIM FOR PAYMENT OF A LOSS IS GUILTY OF A CRIME AND MAY BE SUBJECT TO FINES AND CONFINEMENT IN STATE PRISON.

The following statement applies to insured parties residing in and to those who make claims with respect to insured loans secured by properties located in New Jersey: ANY PERSON WHO KNOWINGLY AND WITH THE INTENT TO DEFRAUD ANY INSURANCE COMPANY OR OTHER PERSON FILES AN APPLICATION FOR INSURANCE OR STATEMENT OF CLAIM CONTAINING ANY MATERIALLY FALSE INFORMATION, OR CONCEALS, FOR THE PURPOSE OF MISLEADING, INFORMATION CONCERNING ANY FACT MATERIAL THERETO, COMMITS A FRAUDULENT INSURANCE ACT, WHICH IS A CRIME.

Other jurisdictions have laws that apply to insured parties and to those who make claims with respect to properties located in their respective areas which: MAKE IT A CRIME FOR PERSONS WHO KNOWINGLY AND WITH INTENT TO INJURE, DEFRAUD OR DECEIVE ANY INSURANCE COMPANY TO FILE A STATEMENT OF CLAIM CONTAINING FALSE, INCOMPLETE OR MISLEADING INFORMATION. SUCH PERSONS ARE SUBJECT TO PROSECUTION AND PUNISHMENT FOR INSURANCE FRAUD. PENALTIES MAY INCLUDE FINES AND/OR IMPRISONMENT.

Among these jurisdictions are: Alaska, Delaware, Florida, Idaho, Indiana, Nevada, New Hampshire, New York and Ohio.

Copyright © 2000, GE Mortgage Insurance

```
Claims on the Web - Audit Adjustments - Microsoft Internet Explorer provided by GE Mortgage Insurance
File  Edit  View  Favorites  Tools  Help
```

Original Interest

Calculated with Original Unpaid Principal Balance

| Note Rate(%) | From Date | To Date | # of Days | Amount |
|---|---|---|---|---|
| 8.25 | 03/01/1999 | 10/15/2001 | 945 | 10,057.89 |

Accumulated Original Interest Total: $ 10,057.89

System Audit Interest

Calculated with Authorized Unpaid Principal Balance

| Note Rate(%) | From Date | To Date | # of Days | Amount |
|---|---|---|---|---|
| 8.25 | 03/01/1999 | 05/31/2001 | 810 | 8,621.05 |
| 8.25 | 09/04/2001 | 10/15/2001 | 42 | 447.02 |

Accumulated System Audit Interest Total: $ 9,068.07

Override Interest    Prefill Override With: Original

Calculated with Authorized Unpaid Principal Balance

| Note Rate(%) | From Date | To Date | # of Days | Amount |
|---|---|---|---|---|

Note Rate: [ ]    From Date: [ ] (mm/dd/yyyy)    To Date: [ ] (mm/dd/yyyy)

[Add]  [Modify]  [Delete]

FIG. 15C

| | | | | | | | | |
|---|---|---|---|---|---|---|---|---|
| Claims on the Web - Audit Adjustments - Microsoft Internet Explorer provided by GE Mortgage Insurance | | | | | | | | |
| File Edit View Favorites Tools Help | | | | | | | | |

Accumulated Override Interest Total: $ [0.00]

Current Interest Audit Results

Interest was adjusted from 6/1/2001 to 9/3/2001 for the amount of 989.82 due to lengthy foreclosure.

Interest Override Adjustment Explanations

Adjustment Amount (override value - original value): $ [0.00]

Original and System Audit Expenses       Jump to Top | Loan Info | Interest Info | Deductible Info | Bottom

| Cat | Item | Seq | Date Paid | Effective Start | Effective End | Monthly Amt | Orig Amount | Sys Aud Amount |
|---|---|---|---|---|---|---|---|---|
| AF | Attorney Fees | 19 | 09/04/2001 | | | | 750.00 | 750.00 |
| AF | Bankruptcy At | 20 | 10/28/1999 | | | | 800.00 | 800.00 |
| PT | Taxes - Count | 21 | 10/13/1999 | | | | 272.71 | 272.71 |
| PT | Taxes - Count | 22 | 04/11/2000 | | | | 283.83 | 283.83 |
| PT | Taxes - Count | 23 | 10/16/2000 | | | | 283.83 | 283.83 |

| | Attorney's Fees | Property Taxes | Hazard Insurance | Property Preservation | Statutory Disbursements | Other Disbursements |
|---|---|---|---|---|---|---|
| Submitted | $1,550.00 | $1,749.64 | $887.00 | $420.00 | $845.66 | $0.00 |
| Authorized | $1,550.00 | $1,542.58 | $887.00 | $420.00 | $842.16 | $0.00 |

Override Expenses       Add Expense Item to Override From: [Original]

| Cat | Item | Seq | Date Paid | Effective Start | Effective End | Monthly Amt | Amount |
|---|---|---|---|---|---|---|---|
| | | | | | | | |

FIG. 15D

Override Expenses

Add Expense Item to Override From: Original

| Cat | Item | Seq | Date Paid | Effective Start | Effective End | Monthly Amt | Amount |
|-----|------|-----|-----------|-----------------|---------------|-------------|--------|

Item: Abandoned Car Removal  Effective Start Date: ☐ Required
Date Paid: 09/06/2001 (mm/dd/yyyy)  Effective End Date: ☐ Required
Amount:  Monthly Payment Amount: ☐ Required

[Add] [Modify] [Delete]

Current Expense Audit Results

The expense item Bankruptcy Costs of 203.50 has been adjusted to the normal and customary amount of 200.00
The expense item Boarding of 307.06 has been adjusted to the normal and customary amount of 100.00
Effective dates not provided for Hazard Insurance.
Effective dates not provided for Taxes - County

Expense Override Adjustment Explanations

Adjustment Amount (override value - original value) - $ 0.00

Deductibles

Jump to Top | Loan Info | Interest Info | Expense Info | Bottom

| Item | Original | System Audit | Override |
|------|----------|--------------|----------|

| Item | Original | System Audit | Override |
|---|---|---|---|
| Escrow Account Balance | $ 0.00 | $ 0.00 | $ |
| Net Rental Proceeds | $ 0.00 | | $ |
| Pledge Savings, Buydowns, or Other Funds Held for Insured | $ 0.00 | | $ |
| Insurance Proceeds | $ 0.00 | | $ |
| Hazard Insurance Refund | $ 0.00 | | $ |
| Cash Contribution | $ 0.00 | | $ |
| Other Deductions | $ 391.00 | | $ |
| Unamortized Premium | $ 0.00 | | |
| Cash Saver Assets | $ 0.00 | | |
| Pledged Assets | $ 0.00 | | |

Current Deductible Audit Results

Deductible Override Adjustment Explanations

Adjustment Amount (override value - original value) · $ 0.00

| Item | Original | System Audit | Override |
|---|---|---|---|
| Presale Proceeds | $ 0.00 | | $ |
| Presale Date | | | |

Presale Override Explanation

FIG. 15F

| | | | |
|---|---|---|---|
| Pledged Assets | | $ 0.00 | |

Current Deductible Audit Results

Deductible Override Adjustment Explanations

Adjustment Amount (override value - original value). $ 0.00

| Item | Original | System Audit | Override |
|---|---|---|---|
| Presale Proceeds | $ 0.00 | | $ |
| Presale Date | | | |

Presale Override Explanation

Adjustment Amount (override value - original value, if original value is nonzero: $ 0.00

Jump to Top | Loan Info | Interest Info | Expense Info | Deductible Info

All actions, except Cancel, will save all changes before moving to the next screen

[ Edit Originals ] [ Run Rules ] [ Cancel ]

Copyright © 2000, GE Mortgage Insurance

Claims on the Web - More Detail - Microsoft Internet Explorer provided by GE Mortgage Insurance

File   Edit   View   Favorites   Tools   Help

*We bring good things to life.*

GE Mortgage Insurance

Claims on the Web - More Detail

- View Claim Status
- Submit New Claim
- Contact GE Claim Rep
- Administration
  - Deductible
  - Expense
  - Pending Reason
  - State Detail
  - Zip Code Filter
  - Find/Delete Claim
- Help
- Logoff

| | |
|---|---|
| Certificate #: | 1234567890 |
| XRef Certificate # | 0000000000 |
| Claim Type: | Initial |
| Claim Submit Date: | 10/29/2001 |
| Delinquency Category | 45 |
| Verified Claim: | $60,372.81 |
| Advanced | $ 0.00 |
| Partial: | $ 0.00 |
| Preliminary: | $ 0.00 |
| Restoration Amount: | $ 0.00 |
| File Location: | C-LMB |
| SPDL # | |
| XRef SPDL # | |
| Cert Level SPDL #. | 0 |

| | |
|---|---|
| Disposition: | PAY CLAIM |
| Cert Effective Date. | 12/10/1996 |
| Reported Delinquency: | 05/24/1999 |
| Monthly Premium. | NO |
| Specified Coverage | NO |
| | MM/DD/YYYY |
| Preliminary Received: | |
| Preliminary Audit By: | |
| Audited By: | |
| Audit Date: | |
| Last REO Download: | 10/16/2001 |
| Workout Code. | |
| Workout By | |
| Workout Date. | |
| Workout Approval: | |

| | |
|---|---|
| Claim Status. | Pending |
| Pending Reason: | |
| 12 mo. Pay History / 24 mo Pay History / Acquisition Decision / Attorney Fee Breakdown / BPO | |
| (Hold CTRL & Click for Multiple Select) | |
| Docs Requested Date: | MM/DD/YYYY |
| Docs Received Date: | MM/DD/YYYY |
| Requested Addtl Docs Date: | MM/DD/YYYY |
| Addtl Docs Received Date. | MM/DD/YYYY |
| Pool Policy#. | 0000000000 |
| MPV's | F L |
| Subject To: | 0 0 0 0 0 64 |
| Note Rate: | 8 25 % |
| Must Buy. | ☐ |
| % Cov. | 30 |
| LPMI Pool#: | 0 |

All actions, except Cancel, will save all changes before moving to the next screen.

General Electric
Mortgage Insurance Corporation

A unit of GE Capital Mortgage Corporation
6601 Six Forks Road, Raleigh, NC 27615
919 846-4100

October 26, 2001

Thomas W. Lind
Wheda
Box 1728
Madison, WI 537011728

Re:  Claim for Loss Settlement
     Borrower Name:     Gary L. Bergmann
     Property Address:     1102 Goold Street
                                  Racine, WI 53402
     Lender Loan Number:     095056600
     Certificate Number:     7950347430
     Claim Submit Date:     10/16/2001
     Claim Type:     Initial Dear Mr. Lind:

Enclosed are funds in the amount of $0.00 and your Explanation of Benefits representing full claim settlement for the loss sustained by you in the sale of the property secured under the above-referenced Claim for Loss.

This payment is offered as full and final settlement of GE Mortgage Insurance Corporation's liability under the referenced certificate. You may submit a Supplemental Claim for Loss for claimable expenses which were not claimed on the original Claim for Loss.

Any amounts paid to you under applicable fire, hazard, and extended coverage policies which are in excess of the cost of restoring and repairing the property must be forwarded to GE Mortgage Insurance.

We appreciate the opportunity to serve you. If you have questions, please call me at (919) 846-4198.

Sincerely,

*Patt Kelly*

Patt O. Kelly
Claim Representative, Claims Operations

Enclosure

Rev. A/03-03-97

FIG. 19B

Final Explanation of Benefits
October 26, 2001

480
482

Borrower Name: Gary L. Bergmann
Property Address: 1102 Goold Street
Racine, WI 53402
Lender Loan Number: 095056600
Certificate Number: 7950347430
Claim Submit Date: 10/16/2001
Claim Type: Initial

| Item | Submitted | Authorized |
|---|---|---|
| Unpaid Principal Balance | $55,220.04 | $55,220.04 |
| Accumulated Interest | $7,631.87 | $7,631.87 |
| Attorney's Fees | $1,375.00 | $1,375.00 |
| Property Taxes | $1,963.99 | $1,963.99 |
| Hazard Insurance | $177.08 | $177.08 |
| Property Preservation | $1,025.00 | $1,025.00 |
| Statutory Disbursements | $1,171.08 | $1,171.08 |
| Other Disbursements | $0.00 | $0.00 |
| Less | | |
| Escrow Account | $14.70 | $80.48 |
| Net Rental | $0.00 | $0.00 |
| Pledged Savings | $0.00 | $0.00 |
| Insurance Proceeds | $0.00 | $0.00 |
| Hazard Insurance Refund | $0.00 | $0.00 |
| Other Deductions | $0.00 | $0.00 |
| Negotiated Deduction | | $0.00 |
| Cash Contribution | $0.00 | $0.00 |
| Unamortized Financed Premium | | $0.00 |
| Cash Saver/Pledged Asset | | $0.00 |
| Total Claim | $68,549.36 | $68,483.58 |
| Net Sales Proceeds | $51,907.40 | $51,909.37 |
| Restoration Amount | | $0.00 |
| Primary Settlement | | $16,609.91 |
| Loss Amount | | $0.00 |
| Percent Coverage | | 100% |
| Guaranty Amount | | $68,483.58 |
| Net Claim | | $0.00 |
| Partial Claim Advance | | $0.00 |
| Advance Claim Payment | | $0.00 |
| Preliminary Claim Payment | | $0.00 |
| Unamortized Financed Premium | | $0.00 |
| Premium Due | | $0.00 |
| Additional Interest | | $0.00 |
| Late Interest | | $0.00 |
| Pool Settlement | | $0.00 |
| Primary Settlement | | $16,609.91 |
| Final Claim | | $16,609.91 |

Reasons for Adjustments  ← 484

1. Accrued interest computed through the sale date.

2. Escrow adjusted to delete monthly PMI premiums, any refund of premium will be made by our Policy Servicing department, after claim settlement.

3. Adjusted net $51,907.40 to $51,909.37, or by $1.97 late charge included with sewar & water.

Interval Calculations

| From Date | To Date | Principal | Days | Rate | Per Diem | Interest |
|---|---|---|---|---|---|---|
| 01/01/2000 | 10/12/2001 | $55,220.04 | 642 | 7.75% | $11.89 | $7,631.87 |

Event Dates

| | | | |
|---|---|---|---|
| Paid To: | 01/01/2000 | Bankruptcy File 1: | 09/19/2000 |
| Foreclosure Start: | 04/20/2000 | Bankruptcy Release 1: | 04/11/2001 |
| Foreclosure Sale: | 06/21/2001 | Bankruptcy File 2: | |
| Foreclosure Restart 1: | | Bankruptcy Release 2: | |
| Foreclosure Restart 2: | | Bankruptcy File 3: | |
| Foreclosure Restart 3: | | Bankruptcy Release 3: | |
| Lender Acquire Title: | 08/20/2001 | Claim Submittal: | 10/16/2001 |

FIG. 22A

| Rule (702) | Triggering Factor(s) (704) | Automation Logic (706) | Pseudocode (708) |
|---|---|---|---|
| Nbr of inspections should not exceed the number of months between loan due date and claim submit date. | # of inspections > # months between loan due and claim submit. | Zero out expense amount on extra inspection expense items Rule output message "Only one inspection per month is claimable. Your extra inspections have been deducted from the claim." | |
| Determine Documents Required Presale Settlement Statement | Presale w/ savings Workout P w/ A and the presold proceeds are not present (0.00) | In addition to this rule; Download workout information at cat 45 & 50. In that download.. If the workout is Presale with "A" eval and no proceeds present, update the status to "pending" and the documents required to "presale settlement statement" | |
| Validate presold proceeds | The presold proceeds are > 0 and; The difference between the presold proceeds and the net on sale (from presale offer screen) is more than 1% of the net on sale amount | Update the status to "pending" and the documents required to "presale settlement statement". Update the docs requested date to current date unless there is already a non-blank date in it. | |
| Cert level special deal, must be reviewed by claim rep.This only applies if there is a claim impact- If claim impact="Y") If not a "Y", do not pend. Confirm that only claim impact deals are downloaded to the DB. | cert level special deal on claimspecialdeal table | Update status to "pending" and update docs required to "TBD based on auditor review" | If cert level spdl > spaces; set status to "pending", set docs required to "TBD based on auditor review" |
| Hazard Refund; if present in deductible section, do not prorate hazard insurance expense. | Hazard Refund > 0 and expense item Hazard Insurance exists. | Retract fact that would cause prorating to happen. | If hazard refund > 0 and there is a fact that says "hazard to prorate"; retract that fact. |
| User BOV;compare to GE BOV | If GE BOV and user BOV are both present, and the user BOV is < 90% or > 110% of GE BOV | Set status to "Pending". Set docs required to "Claim Rep Review". Rule output message of "Requires claim rep review due to market value variance." | If ge bov > user bov, divide user bov by ge bov. If result is < .90 or > -1.10; set status to "pending", set docs required to "Claim Rep Review", set output message to "Requires claim rep review due to market value variance" |

| | | | |
|---|---|---|---|
| Comments entered | Comments > spaces | Set status to "Pending". Set docs required to "Claim Rep Review". Rule output message of "Comments entered must be reviewed by GE Claim Rep." | 700 |
| Occupied Status | isPropertyVacant = 0 | If disposition is "Acquire" set status to "Pending". Set docs required to "Access Information";Update the docs requested date to current date unless there is already a non-blank date in it. Rule output message of "Your claim is under further review for possible acquisition. Please notify GE when property is vacant" | |
| Unknown Status | isPropertyVacant = 0 | if disposition is "Acquire" set status to "Pending". Set docs required to "Access Information": Rule output message of "Your claim is under further review for possible acquisition. Please notify GE when property is vacant" | |
| Foreclosure start date exists without a ditto foreclosure sale date or presale date. | | Set status to "pending". Set docs required to "Foreclosure sale date" Update the docs requested date to current date unless there is already a non-blank date in it. Rule Output message of "F/C start date without F/C sale date or presale date". | |
| PMI under different expense name | Expense amount is exactly the same as the pmi amount from RMG. | Update that expense amount to 0. Rule Output message of "Mortgage insurance premium filed as (expense item) is not allowable and has been deducted from the claim". | |
| Prorate Flood Insurance | Flood Insurance expense present with effective from and to dates | Same as current Hazard Insurance expense proration. | |
| Prorate Earthquake Insurance | Earthquake Insurance expense present with effective from and to dates | Same as current Hazard Insurance expense proration. | |
| Prorate Taxes | Taxes expense item exists with effective from and to dates | Same as current Hazard Insurance expense proration. | |

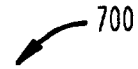

FIG. 22C

| | | | |
|---|---|---|---|
| Cash Contribution | Cash Contribution entered on claim form not = cash contribution from mainframe | Set status to "pending". Set docs required to "Claim Rep Review" Rule Output message of "Manual review required due to discrepancy with the cash contribution amount of the approved workout". | |
| Update initial audit disposition | timesRulesRun is 0 | Set initialDisposition (ClaimDetail) to the auditDisposition value. | |
| 0 interest rate | If interest rate is zero | Set status to pending. Docs required to "Claim Rep Review" Rule output message of "Interest rate missing" | |
| Investigations file location | When file location begins with 'I' | Do not change the file location to a claim rep. | |
| Letter Text | Hazard has been prorated | Rule output message of "The hazard insurance expense that was paid on " exp pd dt "has been prorated from" eff from dt "to" eff to dt "at" per diem. | |
| Letter Text | Single Financed Premium product | Rule output message of "Final claim includes the full unamortized financed premium amount of $" pmiPremiumAmt"." | isFinancedPremium = 1 |
| Letter Text | CashSaver product | Rule output message of "There may be a separate check coming for the loss mitigation efforts on this certificate" | auditDisposition = "presold" or "acquire", and isCashSaverAdvantage = 1 or isCashSaverNewSouth = 1 or isNavyFederalPledgedAsset = 1 |

700

SYSTEMS AND METHODS FOR AUTOMATIC SUBMISSION, AUDIT AND ADJUSTMENT OF MORTGAGE INSURANCE CLAIMS

A computer program listing appendix is being submitted herewith, in duplicate, on a compact disc, and is incorporated herein by reference in its entirety. The compact disc containing the following files:

| FILE NAME | DATE | SIZE |
| --- | --- | --- |
| clmdbfn.cpp | Oct. 15, 2001 | 31,853 |
| clmget.cpp | Oct. 15, 2001 | 46,509 |
| clmstrng.cpp | Oct. 15, 2001 | 3,514 |
| clm_calc.art | Oct. 15, 2001 | 98,812 |
| clm_control.art | Oct. 15, 2001 | 9,846 |
| clm_glob.art | Oct. 15, 2001 | 5,543 |
| clm_init.art | Oct. 15, 2001 | 16,386 |
| clm_map.art | Oct. 15, 2001 | 19,368 |
| clm_phld.art | Oct. 15, 2001 | 40,664 |
| clm_rls1.art | Oct. 15, 2001 | 111,529 |
| clm_rls2.art | Oct. 15, 2001 | 86,387 |
| clm_schm.art | Oct. 15, 2001 | 21,237 |
| clm_socs.art | Oct. 15, 2001 | 4,076 |
| clm_utl.art | Oct. 15, 2001 | 52,352 |
| clm_vld.art | Oct. 15, 2001 | 62,050 |
| dateutil.cpp | Oct. 15, 2001 | 28,349 |
| genutil.cpp | Oct. 15, 2001 | 25,839 |

BACKGROUND OF THE INVENTION

1. Field of the Invention

The present invention relates generally to improvements to systems and methods for processing insurance claims, and more particularly to advantageous aspects of systems and methods for submission, audit, adjustment and payment of mortgage insurance claims.

2. Description of the Prior Art

When a servicer submits a claim under a mortgage insurance policy, the servicer typically wants to reach an acceptable settlement of the claim as expeditiously as possible. In addition, if some or all of the submitted claim is disallowed by the mortgage insurance company, a servicer typically would like to know the reasons behind the disallowance as soon as possible in order to take appropriate action including, for example, submitting a supplementary claim. Further, from the point of view of the insurance company, it is desirable to make the claims settlement process more efficient in order to optimize the company's use of its human resources.

SUMMARY OF THE INVENTION

The above-described issues and others are addressed by the present invention, various aspects of which provide systems and methods for automatically processing mortgage insurance claims submitted over a network. In a system according to an aspect of the invention, a servicer submits a mortgage insurance claim by entering claim data into a servicer terminal connected into a network. A network server computer receives the claim data from the servicer terminal and accesses a claims database and a claim audit rulebase to automatically perform an audit and adjustment of the claim. The system automatically provides results of the audit and adjustment to the servicer at the servicer terminal, and provides the servicer with an option to interact with a claim representative to resolve any issues remaining after the audit.

Additional features and advantages of the present invention will become apparent by reference to the following detailed description and accompanying drawings.

BRIEF DESCRIPTION OF THE DRAWINGS

FIG. 8 shows a screenshot of a coverage validation screen according to an aspect of the invention.

FIGS. 10A through 10E show a claim submission screen according to an aspect of the invention.

FIGS. 11A and 11B show an audit results screen according to an aspect of the invention.

FIGS. 12A through 12C show a preliminary explanation of benefits screen according to an aspect of the invention.

FIGS. 13A through 13D show a view claim screen according to an aspect of the invention.

FIGS. 14A through 14F show an edit originals screen according to an aspect of the invention.

FIGS. 15A through 15F show an audit adjustments screen according to an aspect of the invention.

FIGS. 17A and 17B show a more detail screen according to an aspect of the invention.

FIGS. 19A through 19C show an exemplary settlement letter according to an aspect of the invention.

FIGS. 22A through 22C show a rules table according to an aspect of the invention.

DETAILED DESCRIPTION

Figure 1:
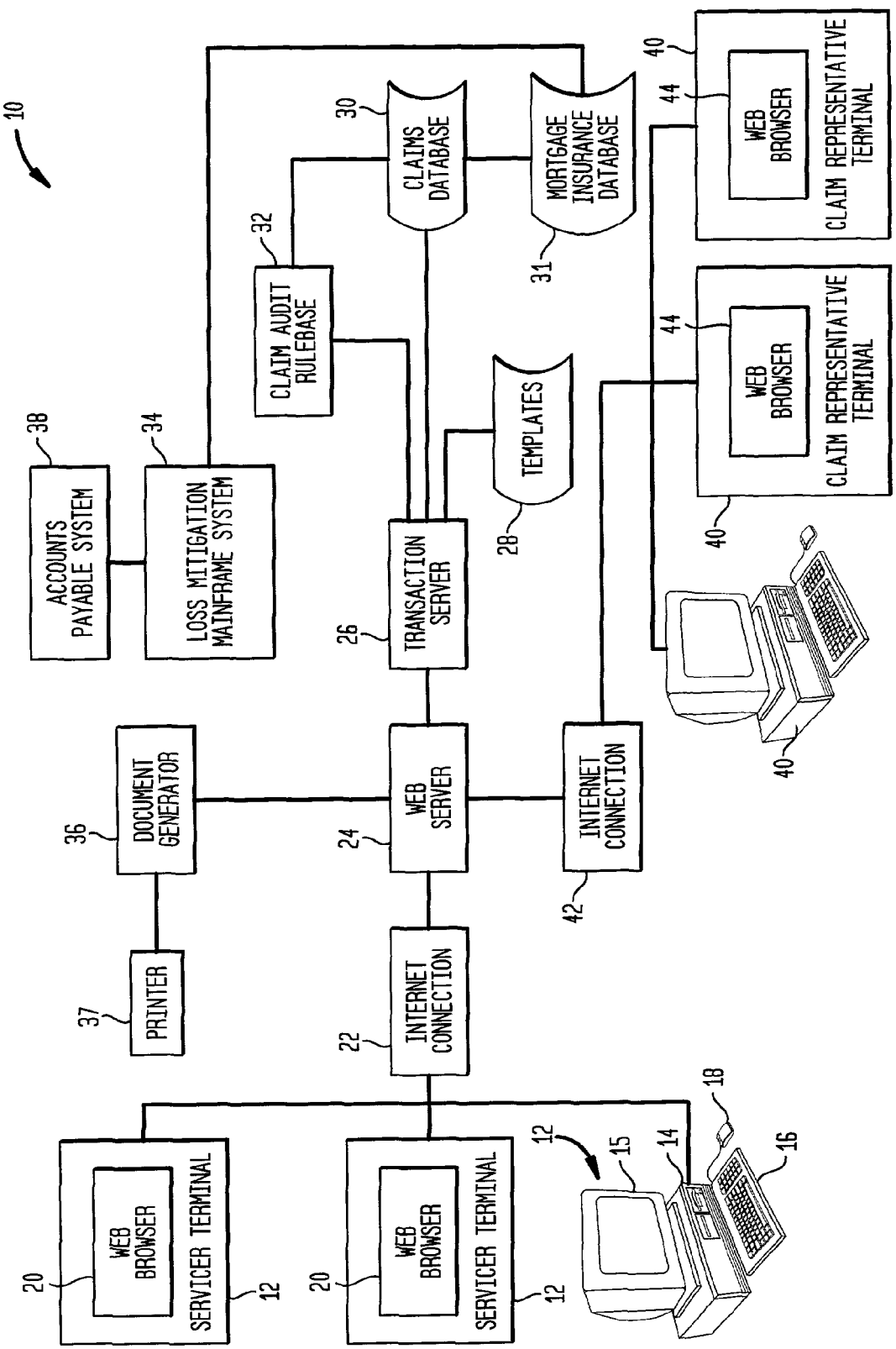
FIG. 1 shows a diagram of an mortgage insurance claim processing system according to an aspect of the invention.

As used herein, the term "servicer" refers to a loan servicing business that has contracted to perform administrative services relating to a loan, including the submission of mortgage insurance claims. The term "servicer" includes employees or other authorized parties acting on behalf of the loan servicing business. The servicer for a given loan may or may not be the financial institution from which the loan originated, and may or may not be the payee of a submitted mortgage insurance claim.

As used herein, the term "claim representative" refers to a mortgage insurance company employee, or other authorized representative, who handles mortgage insurance claims. Aspects of the present invention provide for a claim representative to be contacted in certain situations.

A first aspect of the invention provides a web-based system that is accessed by a servicer over the Internet to submit mortgage insurance claim data using an on-line claim for Loss form. After the data has been submitted, an automated claim audit rulebase determines the validity of the claim amounts submitted, and further determines whether there is a possibility of loss mitigation. The rules used to determine the validity of claims and loss mitigation potential are designed to allow the system to be as user-friendly as possible.

Even though the system is automated, the system preserves the integrity of the claims process, and no financial controls are lost. Based upon the inputs entered into the system, the claim audit rulebase automatically audits and adjusts the claim and calculates a total allowable claim amount, net of policy deductions. At the end of the calculation, each deduction is displayed to the servicer with an explanation of the basis of the deduction. If the servicer believes that an exception applies to a particular deduction, the servicer clicks on an e-mail link and, using e-mail, explains the exception to a claim representative. The system automatically provides an on-screen summary of the settlement terms, and an anticipated payment date. The system further automatically generates a hard copy of an official settlement letter to be sent to the servicer.

Throughout the process, there are field validations and calculations allowing the servicer an opportunity to edit the information entered. The servicer is further provided with the option of reviewing the findings at a later time, if preferred. An additional feature of the system allows a servicer to query the status and audit results of an individual claim or group of claims submitted.

According to a further aspect of the invention, the claim audit rulebase provides for a number of different outcomes, including: Pay or Acquire. These outcomes reflect whether the rulebase has determined that there is a possibility for the mortgage insurance company to mitigate the amount of the claimed loss by acquiring the distressed property.

Typically, at the time the servicer files a mortgage insurance claim, the borrower has defaulted on the loan secured by the mortgage, and the servicer has acquired possession of, and title to, the distressed property in a foreclosure proceeding. If, prior to the submission of the mortgage insurance claim, the servicer has sold the distressed property, then there is no opportunity for loss mitigation. In that case, the claim audit rulebase classifies the claim as a Presale. The system automatically calculates the amount of the claim and communicates that amount to the servicer as described above.

If, however, the servicer still has title to the distressed property at the time the mortgage insurance claim is submitted, the claim audit rulebase determines whether there is a possibility for the amount of the insured loss to be mitigated through an acquisition of the property by the mortgage insurance company. If the engine determines that there is, in fact, a possibility for loss mitigation, the engine classifies the claim as a Hold or an Acquire, and informs the servicer that the insurance company is considering the acquisition of the distressed property.

Whether a claim is classified as a Hold or an Acquire depends upon whether additional consideration is required to make the decision whether to acquire the distressed property. Where the claim meets certain guidelines indicating that acquisition is an appropriate course of action, the claim is classified as an Acquire. However, if additional consideration is required by personnel at the mortgage insurance company, the claim is classified as a Hold. In either event, the claim is referred to appropriate mortgage insurance company personnel for appropriate followup.

As mentioned above, an aspect of the invention automatically provides a servicer submitting a claim with an explanation of any adjustments made by the system to the submitted claim. Armed with this knowledge, the servicer has the ability to submit additional information or to explain an expense item before the claim settlement has been processed. This assists the servicer, and also allows the mortgage insurance company to be more productive by reducing the number of supplemental claims to be processed. Currently, after a servicer has received claim settlement funds, the servicer in many cases will elect to submit a supplemental claim to recover expenses that were not allowed by the claim representative during the initial claim adjustment process. The system also may reduce followup time by setting reasonably accurate expectations of when claim settlements will be received. Currently, it is not uncommon for a servicer, not having a precise idea as to when payment is to be made, to contact mortgage insurance company personnel, thus placing an unnecessary burden on both the servicer and the mortgage insurance company. Similarly, the present invention also reduces followup time by allowing a servicer to make inquiries on-line regarding the status of submitted claims.

FIG. 1 shows a web-based automated mortgage insurance claim processing system 10 according to an aspect of the invention. It should be noted that it is possible to configure the system 10 in a number of different ways without departing from the spirit of the invention. The system 10 includes a network of servicer terminals 12 that capture mortgage insurance claim data from servicers. In the FIG. 1 system 10, the network of servicer terminals is connected into the network using an Internet connection 22. However, it would also be within the spirit of the invention for a servicer to access the system 10 using other types of network connections.

Each servicer terminal 12 may be a stand-alone personal computer, workstation, or the like, running on a suitable operating system platform, such as Microsoft Windows. An exemplary servicer terminal 12 is illustrated as a personal computer 14 that includes a display 15, a keyboard 16, and a mouse 18. If desired, a printer (not shown) may also be connected to the personal computer 14. Other types of input and output devices may be used without departing from the spirit of the invention. Each servicer terminal 12 runs a suitable web browser 20, such as Microsoft Internet Explorer or Netscape Navigator.

The servicer terminals 12 are connected using an Internet connection 22, or other network connection, to a centralized web server computer 24. In the present configuration of the system 10, the web server computer 24 acts as a waystation, for sending web pages out to the servicer terminals 12, and for receiving data inputted by servicers and captured at the servicer terminals 12.

Web pages are generated by a transaction server computer 26 in the form of active server pages (ASPs). In generating the web pages, the transaction server computer 26 uses stored templates 28. In addition, the transaction server computer 26 has access to a claims database 30, which contains information relating to the submitted claim.

When a servicer submits a claim at a servicer terminal 12, the claim data is captured in a web page and transmitted via the Internet connection 22 to the web server 24, which in turn relays the captured data to the transaction server 26. The transaction server in turn accesses a claim audit rulebase 32 that automatically audits and adjusts the submitted claim. As its name implies, the claim audit rulebase 32 includes rules, triggering factors indicating when a rule should be invoked, and automatic logic dictating actions to be performed by the claim audit rulebase 32 when a rule is invoked.

As mentioned above, there are a number of possible outcomes of the automatic audit and adjustment performed by the claim audit rulebase 32, including Pay or Acquire. In a Pay outcome, the system 10 has determined that a payment is to be made on the submitted claim, and the servicer is informed of the amount of the adjusted claim, as well as a projected date for payment. In an Acquire outcome, the system 10 has determined that there is a possibility of loss mitigation through an acquisition of the distressed property, and the servicer is informed of this determination.

Finally, the web server computer 24 accesses a document generator server 36 that automatically creates a settlement letter that is printed out on a printer 37 and mailed to the servicer. In addition, the loss mitigation mainframe computer 34 accesses the claims database 30 and the mortgage insurance database 31 to effect payment of the claim in a form requested by the servicer. Payment options include payment by an automated clearinghouse (ACH) transaction or by paper check.

If issues arise during the claim adjustment process that cannot be resolved automatically by the system 10, the servicer is automatically invited to contact a claim representative by e-mail. As shown in FIG. 1, claim representatives may be connected into the system 10 through a network of claim representative terminals 40 connected to the web server 24. Although an Internet connection 42 is shown in FIG. 1 for connecting the claim representative terminals 40 to the web server 24, it would also be within the spirit of the invention for the claim representative terminals 40 to be part of an internal, local network. Like the servicer terminals 12, the claim representative terminals 40 run a suitable web browser 44, such as Microsoft Internet Explorer or Netscape Navigator. In addition to e-mail, a servicer may use other modes of communication to contact a claim representative, including telephone, fax, and regular mail.

Figure 2:
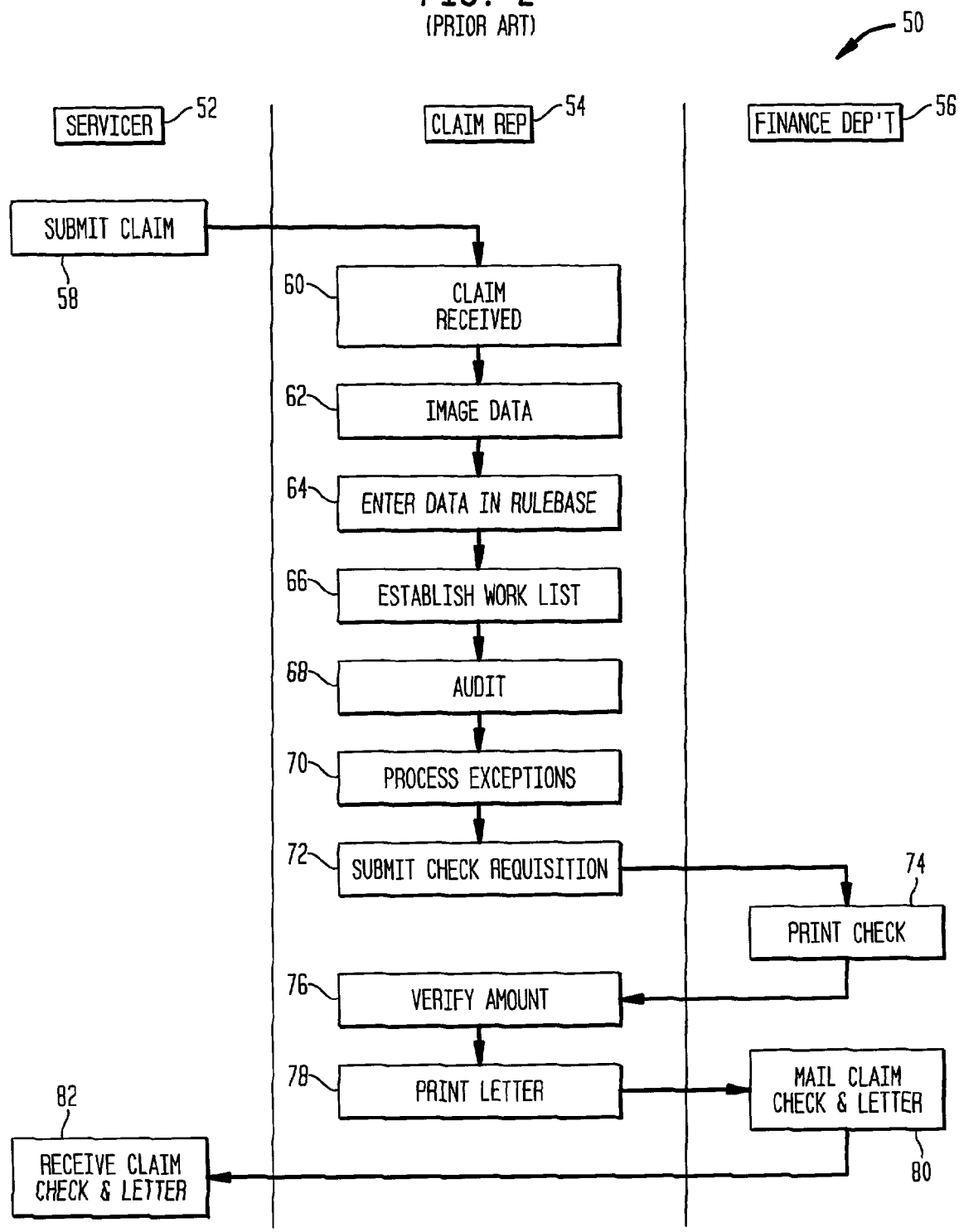
FIG. 2 shows a process map of a mortgage insurance claim adjustment process according to the prior art.
Figure 3:
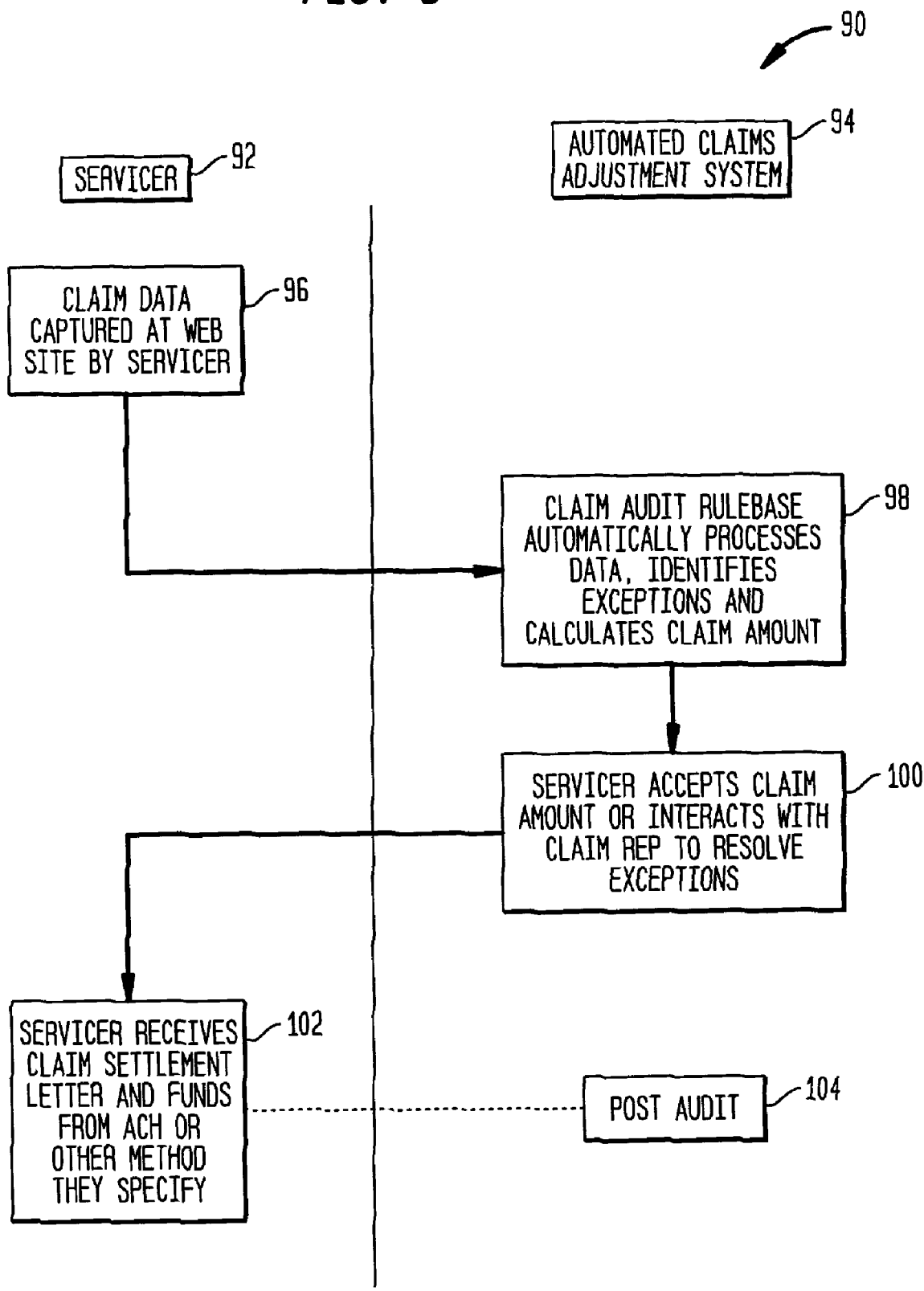
FIG. 3 shows a process map of a mortgage insurance claim adjustment process according to an aspect of the invention.

The operation of the present invention may be better understood with reference to FIG. 2, which shows a process map of a claim adjustment process 50 according to the prior art, and FIG. 3, which shows a process map of an automated claim adjustment process 90 according to an aspect of the invention.

In the claim adjustment process 50 shown in FIG. 2, it will be seen that there are three basic participants in the process: a servicer 52; a claim representative 54, who is typically an employee of a mortgage insurance company; and the mortgage insurance company's finance department 56.

A claim is initiated when the servicer 52 submits a claim in step 58. As discussed above, a servicer typically submits a claim after the borrower has defaulted and the distressed property has been foreclosed upon. In the prior art, the submission of a claim in step 58 is typically accomplished using a paper form that has been filled out by the servicer 52 and then mailed or otherwise conveyed to the claim representative 54.

In step 60, the claim is received by the claim representative 54, who then images the claim data in step 62 and enters the imaged data into a claim audit rulebase 64. In step 66, the claim audit rulebase 64 is used to establish a work list that in step 68 is used by the claim representative 54 to audit the submitted data. In step 70, the claim representative 54 processes any exceptions identified in the claim data, and in step 72, the claim representative submits a check requisition to the finance department.

In step 74, the finance department 56 prints out a check. In step 76, the amount of the check is verified by the claim representative 54, who in step 78 then prepares a settlement letter. The settlement letter is then transmitted to the finance department 56 so that, in step 80, the finance department 56 can mail the claim check and settlement letter to the servicer 52. In step 82, the servicer 52 receives the settlement letter and claim check. If the servicer 52 has an issue with the amount of the claim check, the servicer 52 then must contact the claim representative 54 and, if necessary, file a supplementary claim, which is then adjusted following steps 60 through 82.

The present invention provides systems and methods whereby many of the steps in the prior art have been eliminated, and in which servicers receive audit amounts in a more expeditious manner. FIG. 3 shows a process map of an automated claim adjustment process 90 according to an aspect of the present invention. As shown in FIG. 3, there are only two major participants in the process: a servicer 92 and an automated claims adjustment system 94, such as the system 10 illustrated in FIG. 1. In step 96, a website is used to capture claim data inputted by the servicer 92. In step 98, a claim audit rulebase automatically processes data, identifies exceptions, and calculates a total claim amount.

As described in further detail below, each rule stored in the claim audit rulebase includes a trigger that determines when the rule is to be invoked. The data submitted by the servicer, as well as data already stored in the system, are analyzed by the system to automatically determine which rules have been triggered. Each triggered rule is then automatically applied to the data, resulting in certain predetermined operations to be performed by the automated claims system 94.

In step 100, the servicer 92 may accept the claim amount by doing nothing and allowing the system to proceed automatically to step 102. However, if the servicer 92 does not accept the claim amount, the servicer 92 is given the option of interacting with a claim representative to resolve any exceptions. In step 102, once a claim amount has been accepted by the servicer, the servicer 92 receives a system-generated claim settlement letter. In addition, the servicer 92 receives funds in payment of the claim amount, either in the form of an ACH transaction or other method specified by the servicer 92. Finally, in step 104, a claim representative performs any required post-audit functions, including, for example, an efficiency or quality control (QC) audit.

It will be appreciated that the present invention has benefits for both a servicer and for a mortgage insurance company. From the servicer's point of view, the benefits include the elimination of paper, the elimination of human error, and expedited processing and payment of a submitted claim. From the point of view of the mortgage insurance company, the advantages include a streamlined process, reduced costs, and increased productivity. It is projected that as much as 100% of current primary claim volume will potentially flow through the process 90 illustrated in FIG. 3, with servicers receiving an immediate calculation of a claim amount for approximately 50% of submitted claims.

Figure 4:
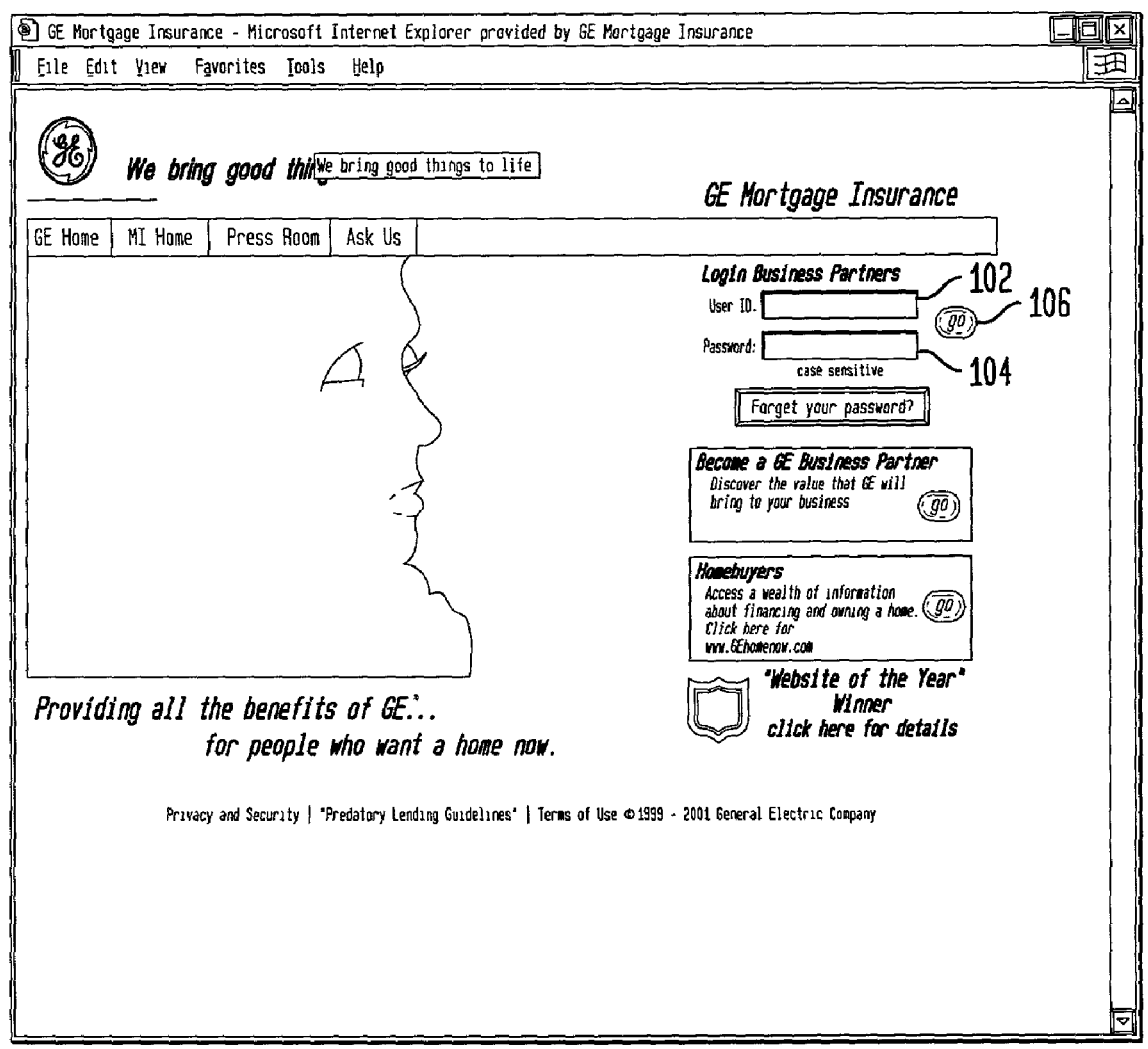
FIG. 4 shows a screenshot of a website home page according to an aspect of the invention.
Figure 5:
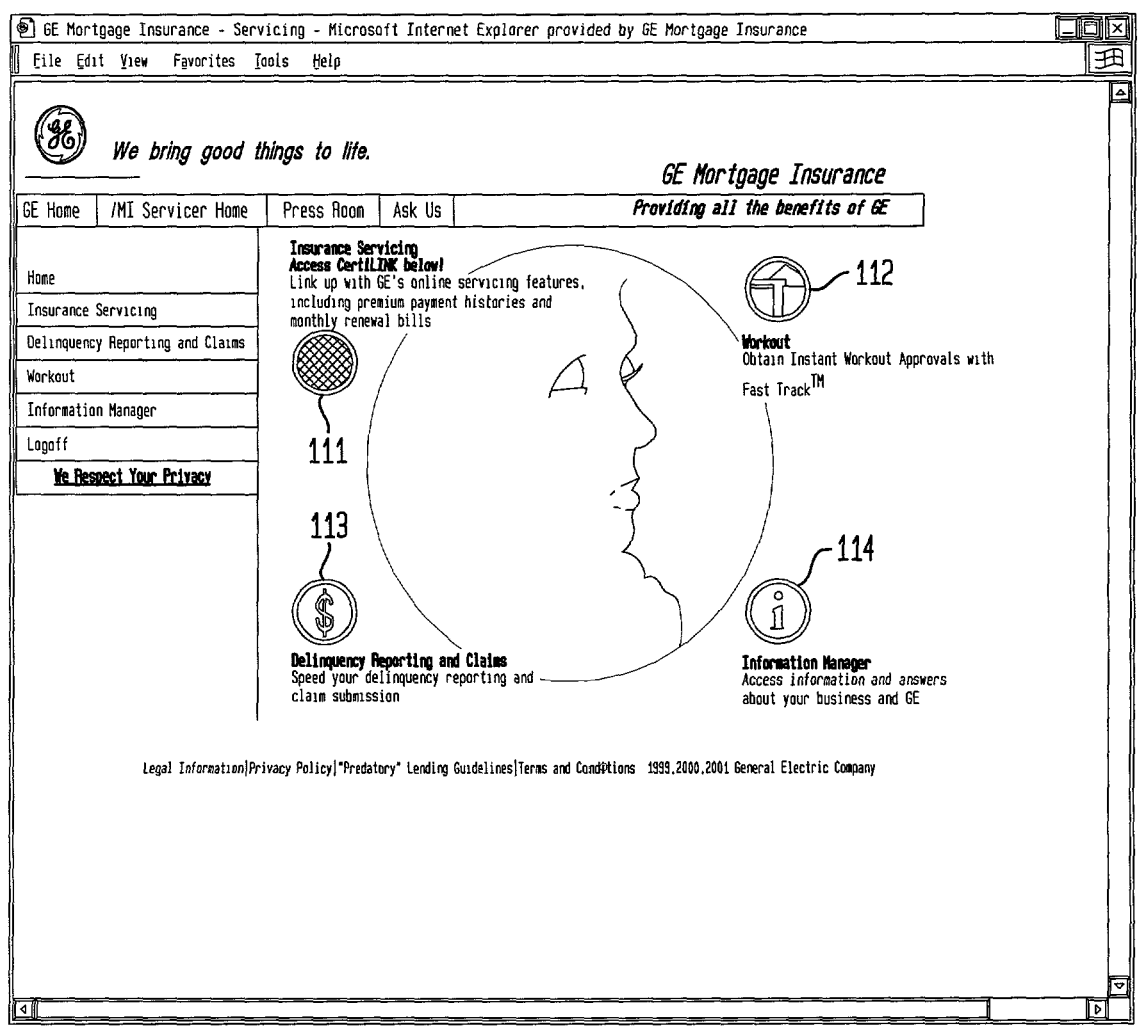
FIG. 5 shows a screenshot of a website main menu screen according to an aspect of the invention.

According to an aspect of the system, the automated claims adjustment system is accessed through an integrated website incorporating a number of different systems relating to the operations of a mortgage insurance company. FIG. 4 shows a screenshot of a website home page 100 according to this aspect of the invention. The home page 100 includes labeled data entry boxes for receiving a user ID 102 and a password 104 that have been assigned to the identified user. After these items are entered, the user clicks on the Go button 106 to go to the website main menu screen 110 shown in FIG. 5.

Figure 6:
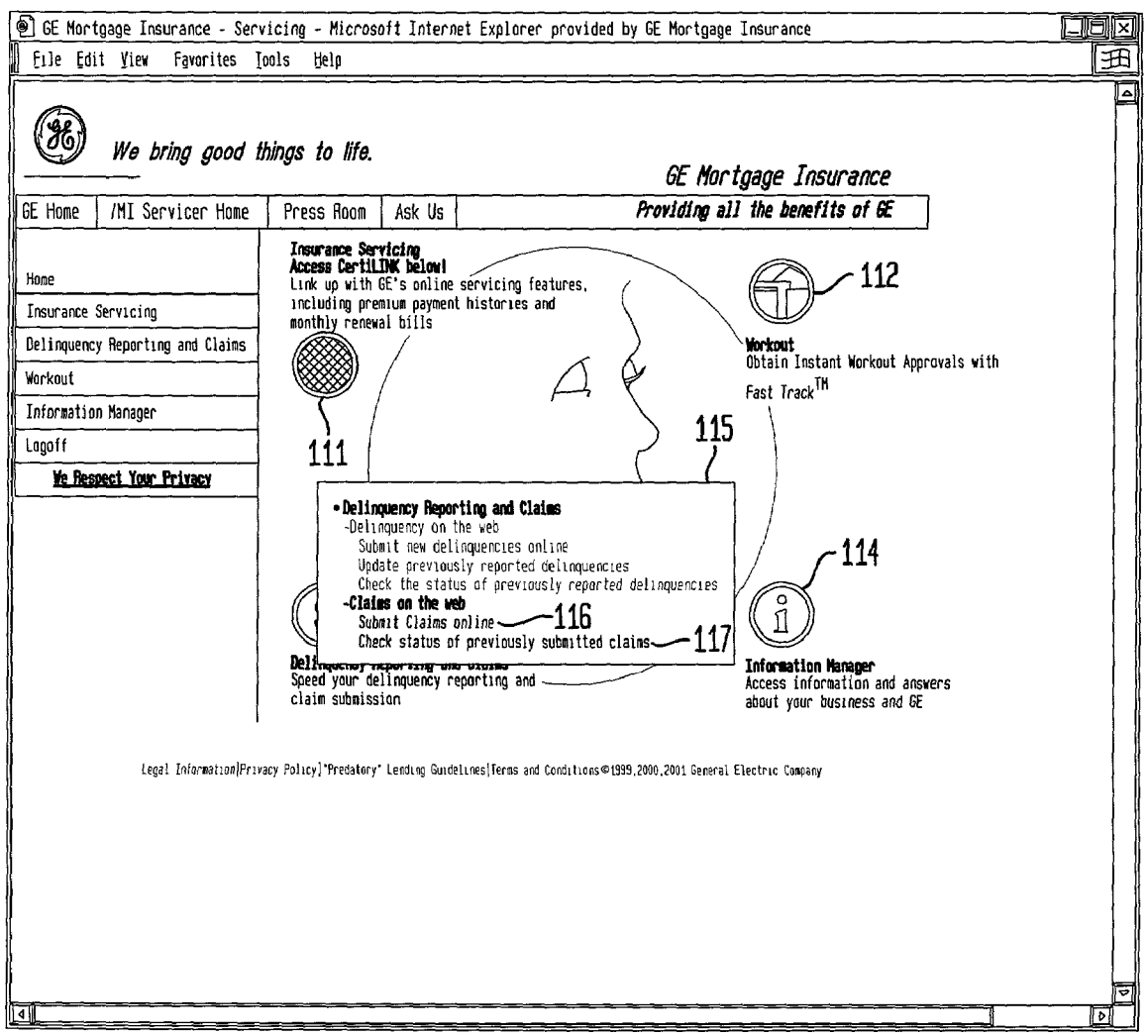
FIG. 6 shows the website main menu screen shown in FIG. 5 with a sub-menu displayed.

The website main menu screen 110 includes labeled buttons 111-114 that allow a user to access different systems that have been integrated into the website. The user accesses an automated claim processing system according to the present invention by clicking on the button labeled Delinquency Reporting and claims 113. Clicking on this button 113 causes the sub-menu 115 shown in FIG. 6 to appear. As shown in FIG. 6, the sub-menu 115 includes two selections under the heading claims on the Web: Submit claims Online 116 and Check Status of Previously Submitted claims 117.

Figure 7:
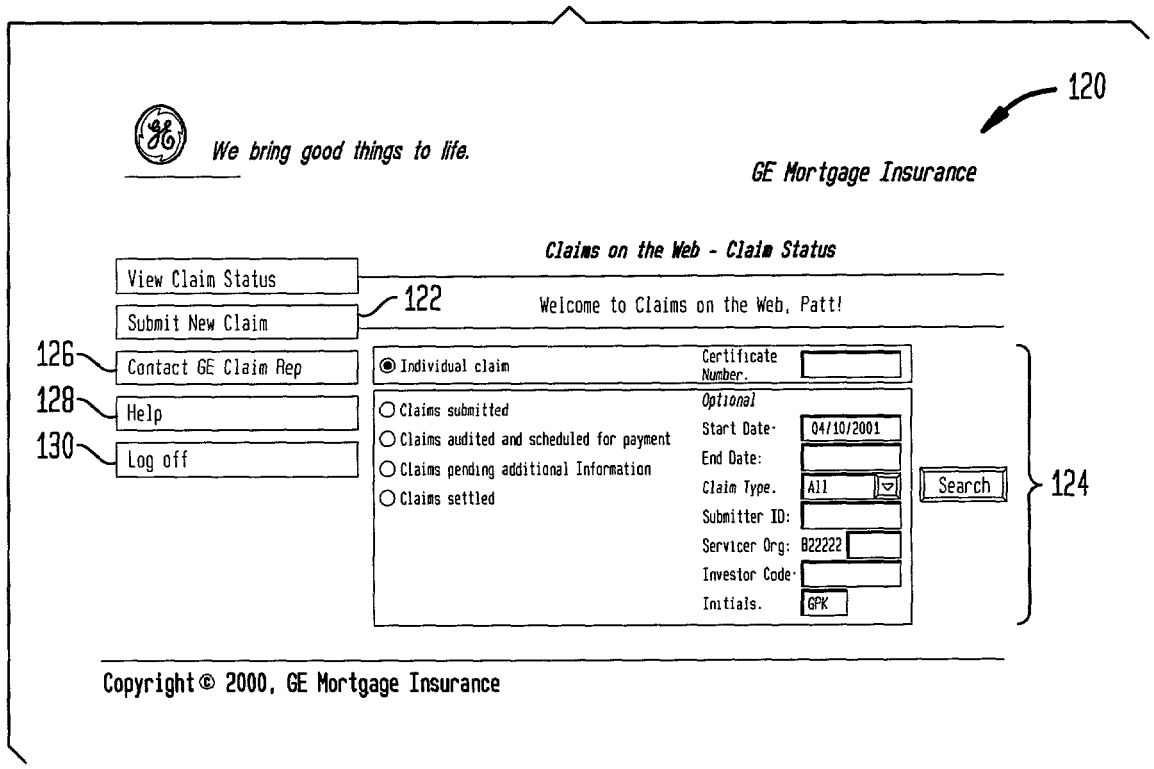
FIG. 7 shows a screenshot of a main menu screen of an automated mortgage insurance claim processing system according to an aspect of the invention.

FIG. 7 shows a screenshot of a main menu status screen 120 according to an aspect of the invention. The main menu status screen 120 allows a servicer to select a function to be performed, including: submit a new claim 122, retrieve an existing claim or claims 124, or contact a claim representative 126. A Help button 128 is provided that, when clicked on by a servicer, causes the system to display instructions on how to complete a claim. Finally, a Logoff button 130 is provided to allow the servicer to exit the system.

Figure 9:
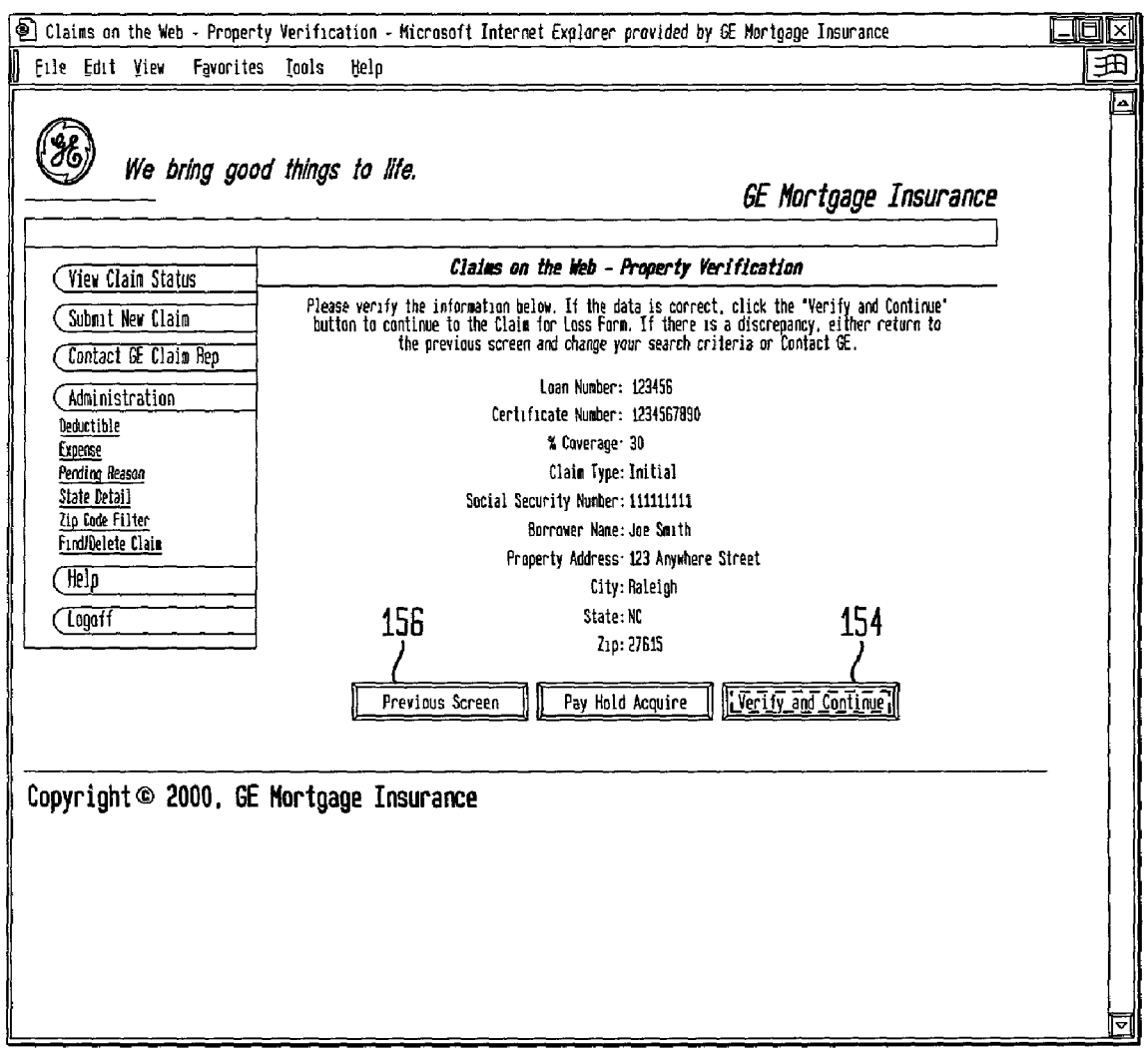
FIG. 9 shows a screenshot of a property verification screen according to an aspect of the invention.

FIG. 8 shows a screenshot of a claim identification screen 140 according to an aspect of the invention. The claim submission process begins with a servicer or other user of the system entering data in one of the following data boxes: certificate number 142, loan number 144, social security number 146, or borrower name 148. The servicer then clicks on the Search button 150, which causes the system to display the property verification screen 152 shown in FIG. 9 to confirm correct coverage. If multiple loans exist that match the search criteria, the servicer is given the ability to select from a list of these loans. The selection causes the system to display the property verification screen. If the servicer verifies that the mortgage property in question is in fact covered by the identified mortgage insurance policy, the loan servicer clicks on the Verify and Continue button 154 on the property verification screen 152. If, however, there is a discrepancy in the listed information, the loan servicer clicks on the Previous Screen button 156 to return to the previous screen to change the search criteria. Alternatively, if there is a discrepancy in the listed information, the servicer may instead contact the mortgage insurer directly.

FIGS. 10A through 10E show a claim submission screen 160 according to an aspect of the invention. The claim submission screen 160 includes a number of sections containing data relating to the submitted claim. These sections include: Loan Information 162, Interest Information 180, Expense Information 200, Deductible Items 200, Property Value Information 240, Access Information 260, Additional Information 280, and claims Authorization and Submission 300. The claim submission screen shown in FIGS. 10A through 10E contains all of the claim data used in the Uniform Mortgage Insurance claim for Loss, which is a standard form in the mortgage insurance industry. According to an aspect of the invention, each of the form sections 162-300 includes data entry fields that are pre-filled with any information already stored in the system. The servicer or other user of the system edits a pre-filled field, or enters data in a blank field, as needed, by clicking on the field with a mouse and using a keyboard to key in data. As described below, certain fields pre-filled by the system are not editable by the servicer. After the servicer has completed the form and verified the accuracy of the information contained in the form, the servicer clicks on a Submit claim button 174 at the bottom of the form 160, which causes the claim to be automatically submitted.

The first section of the form 160 is a Loan Information section 162, shown in FIGS. 10A and 10B. The Loan Information section 162 includes general information relating to the mortgage insurance policy for which the claim is being submitted. Certain fields, including the % Coverage field 170 and the claim Type field 172, are automatically pre-filled by the system and are not editable by the servicer.

As shown in FIG. 10B, the second section of the form 160 is an Interest Information section 180. This section 180 is used to calculate the total amount of interest owed by the borrower as a result of the mortgage default. This section 180 includes an Unpaid Principal Balance field 182, which contains the unpaid principal balance 182 of the loan in default.

The Interest Information section 180 includes an adjustable rate mortgage (ARM) calculator. Where different interest rates have applied during different periods of the loan, these rates are entered into the system using the boxes labeled: From Date 188, To Date 190, and Note Rate 192. The servicer then clicks on the Add button 194. The inputted information is displayed in box 196. The total amount of interest that has been verified by calculation is displayed as a data field labeled Accumulated Interest 198.

The Expense Information section 200, shown in FIG. 10C, is used to enter expenses incurred by the servicer that may be recoverable under the mortgage insurance policy. This section 200 includes a drop-down menu 202, which includes all of the categories of expenses recognized on Uniform Mortgage Insurance claim for Loss. After the user has identified an expense category using the drop-down menu 202, the user then enters an amount for the expense in the Amount box 204 and the date upon which the expense was incurred in the Date box 206. The servicer and then clicks the Add button 208, which causes the item to be added to a cumulative list of expenses 210. Depending on the expense selected in 202, entries may be required in the boxes labeled Effective Start Date 212, Effect End Date 214, or Monthly Payment Amount 216.

The Deductible Item section 220, shown in FIGS. 10C and 10D, is used to enter deductible items that are standard within the mortgage industry. The Property Value Information section 240, shown in FIG. 10D, contains the current market value of the distressed value, the servicer/invest value, and the respective value dates. The Access Information section 260, also shown in FIG. 10D, contains the status of the distressed property: Vacant, Occupied, or Unknown. In addition, the Access Information section 260 contains the name and telephone number of the person holding the key to the property. The Additional Information section 280, shown in FIGS. 10D and 10E, allows the servicer to update critical dates related to the delinquency used in the claim Audit rulebase. The claims Authorization and Submission section 300, shown in FIG. 10E, includes a certification by the servicer of the submitted claim information, and includes boxes for inputting contact information for the person submitting the claim.

Figure 11B:
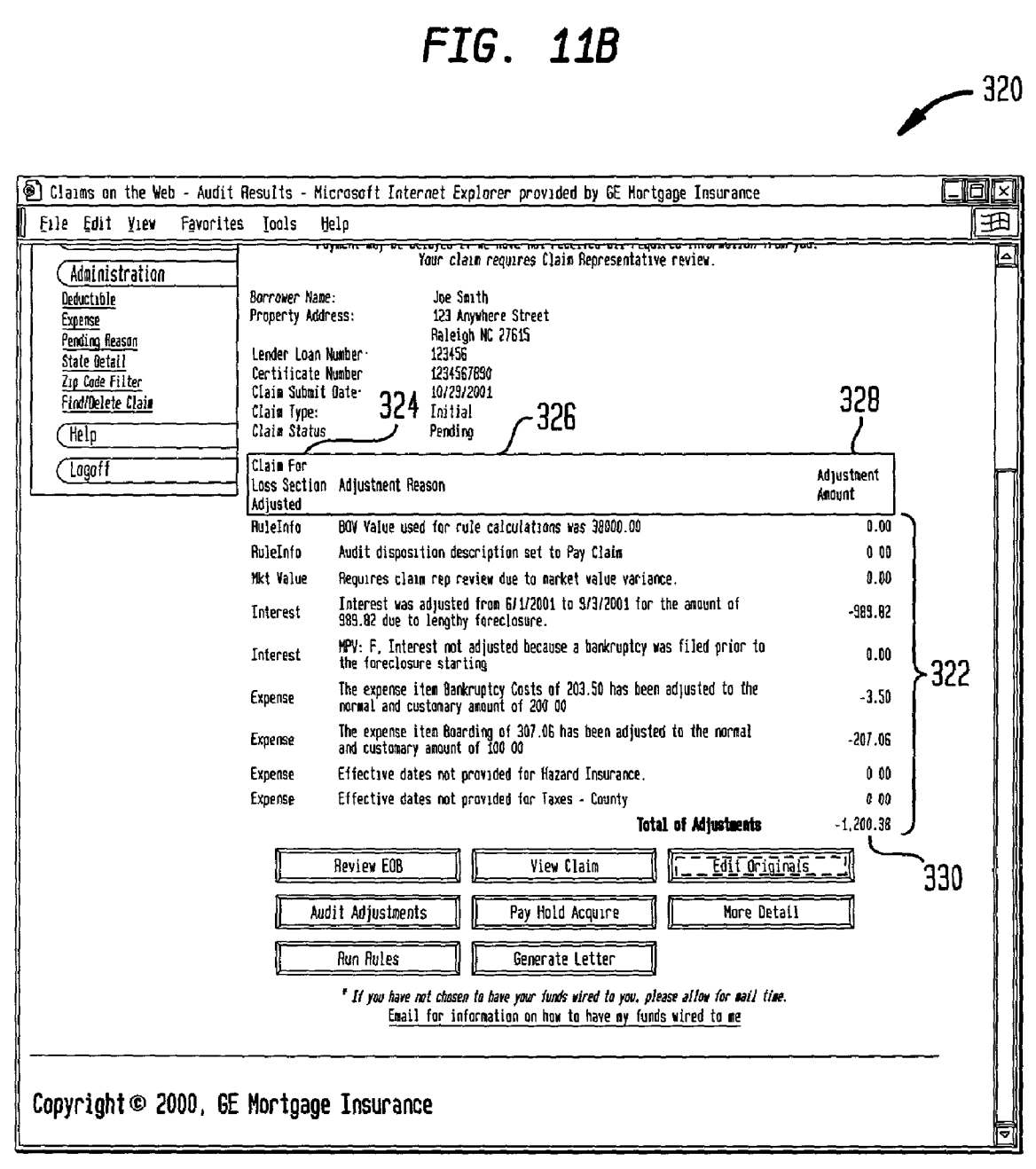

FIGS. 11A and 11B show an audit results screen 320 according to an aspect of the invention. This screen 360 is used to provide immediate feedback to a servicer regarding a submitted claim. As shown in FIGS. 11A and 11B, the audit results screen 320 provides an itemized list of adjustments that have been made to the claim by the system. The list is presented in a table 362. For each adjustment, the first column 324 lists the section of the claim for Loss form adjusted, the second column 326 lists the reason for adjustment, and the third column 328 lists the amount of the adjustment. A total amount of adjustments 330 appears under the third column 328.

The list of explanations provided by the audit results screen 320 helps a servicer to understand the basis for exceptions and adjustments, and may answer questions regarding the submitted claim without having to consult a claim representative at the mortgage insurance company. Further, even if a servicer deems it necessary to contact a claim representative, the information received on the audit results screen 320 allows the servicer to conduct a more intelligent conversation with the claim representative than would otherwise be the case. Thus, it will be appreciated that the present invention serves to expedite the claim submission process, and may lead to a significant time saving.

Figure 12A:
Figure 13A:
Figure 14A:
Figure 15A:

FIGS. 12A through 12C show a preliminary explanation of benefits screen 340 according to an aspect of the invention. This screen 340 is used to provide the service with a preliminary itemized explanation of a claim amount calculated by the system. As shown in FIG. 12A, the preliminary explanation of benefits screen 340 includes an Item section 342, listing for each claim item the amount submitted by the servicer and the amount allowed by the system. These amounts are added together to arrive at a total claim amount 344. In addition, as shown in FIG. 12B, the screen 340 includes a Loss Amount 336, a guaranty amount 348, a net claim amount 350, and a preliminary claim amount 352. The screen 340 further includes a list of reasons for adjustments 354, interval calculations 356. As shown in FIGS. 12A and 12B, the screen 340 also includes a section listing event dates 358.

FIGS. 13A through 13D show a view claim screen 360 according to an aspect of the invention. The view claim screen 360 allows a server to view a previously entered claim, without the ability to change data.

FIGS. 14A through 14F show an edit originals screen 380 according to an aspect of the invention. The edit originals screen 380 is only shown internally to a claim representative or other authorized personnel. The edit originals screen 380 shows the claim as originally entered by the servicer. The claim representative or other authorized personnel is able to correct any data entry errors made by the servicer.

FIGS. 15A through 15F show an audit adjustments screen 400 according to an aspect of the invention. The audit adjustments screen 400 is only shown internally to a claim representative or other authorized personnel. This screen is used by a claim representative to override adjustments made by the claim audit rulebase when there are circumstances outside the scope of the claim audit rulebase logic that affect the settlement of the claim.

Figure 16:
FIG. 16 shows a pay hold acquire screen according to an aspect of the invention.

FIG. 16 shows a screenshot of a pay hold acquire screen 420 according to an aspect of the invention. This screen is only shown internally to a claim representative or other authorized personnel. The pay hold acquire screen 420 shows a list of parameters, displayed in a matrix of labeled data boxes 422, which are used by a claim audit rulebase, such as the claim audit rulebase 32 shown in FIG. 1, in determining whether to characterize a submitted claim as a Pay, Hold, or Acquire. The type of disposition arrived at by the system is displayed as a non-editable data field 424 in the upper right portion of the screen 420. Editable data boxes appearing on the screen 420 are used by a claim representative or other authorized person to revise the disposition parameters, as needed.

Figure 17B:
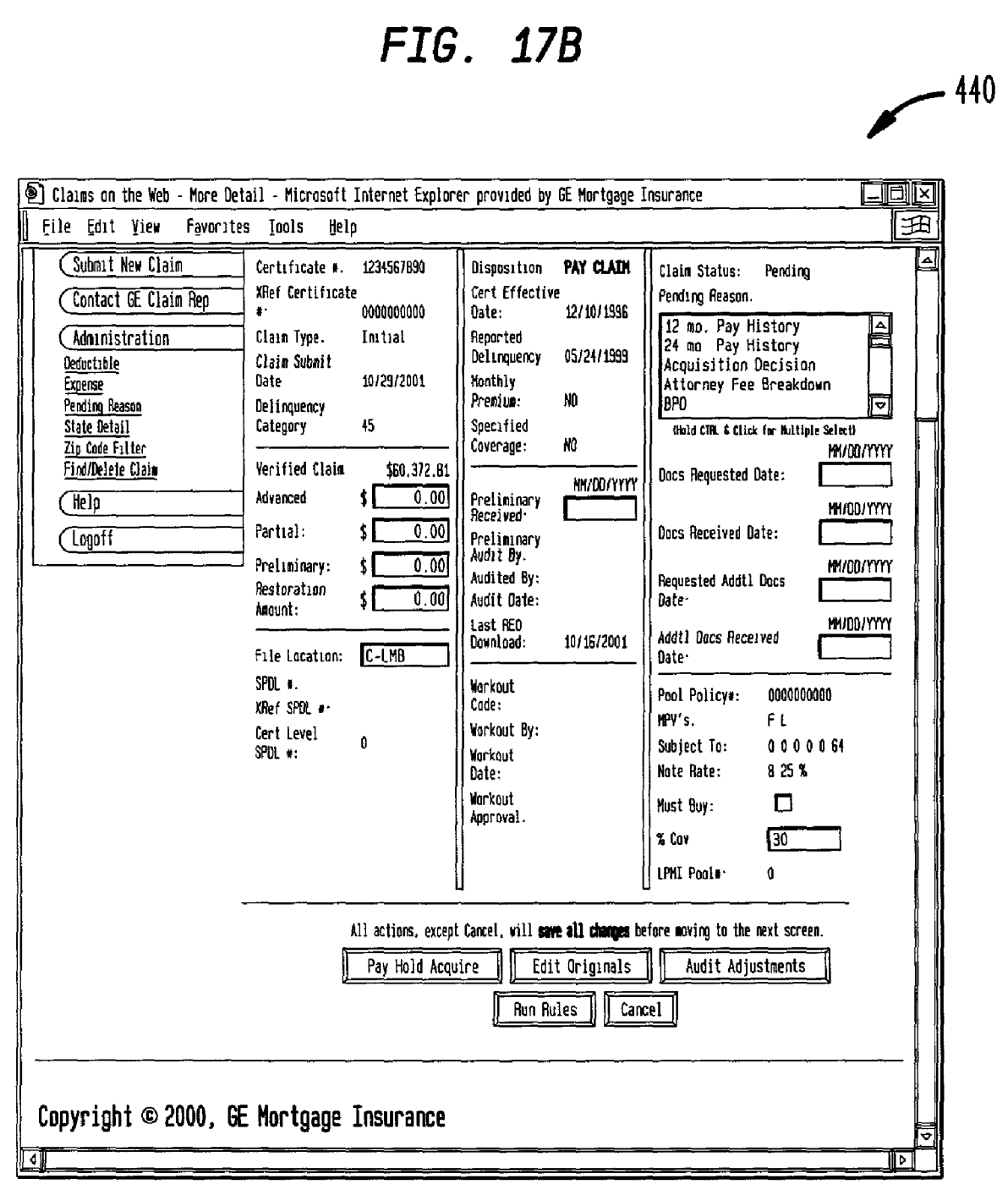

FIGS. 17A and 17B show a more detail screen 440 according to an aspect of the invention. This screen is for internal use only, and provides additional background information to the claim representative. The screen is also used for input of data used internally for an audit.

Figure 18:
FIG. 18 shows a generate settlement letter screen according to an aspect of the invention.

FIG. 18 shows a generate settlement letter screen 460 according to an aspect of the invention. This screen allows a claim representative or other authorized personnel to cause the system to generate a settlement letter. Once the claim representative has selected among various presented options, the claim representative clicks on the Generate Letter button 462 to cause the settlement letter to be generated.

FIGS. 19A through 19C show an exemplary settlement letter 480 generated by the system, to be sent to the servicer after the automatic claim settlement process has been completed. As mentioned above, this letter may be generated by the system using a server computer such as the document generator server 36 shown in FIG. 1, and printed out on a printer 37 for mailing to the servicer. The settlement letter 480 includes a section entitled Final Explanation of Benefits 482 and a section entitled Reasons for Adjustments 484.

Figure 20:
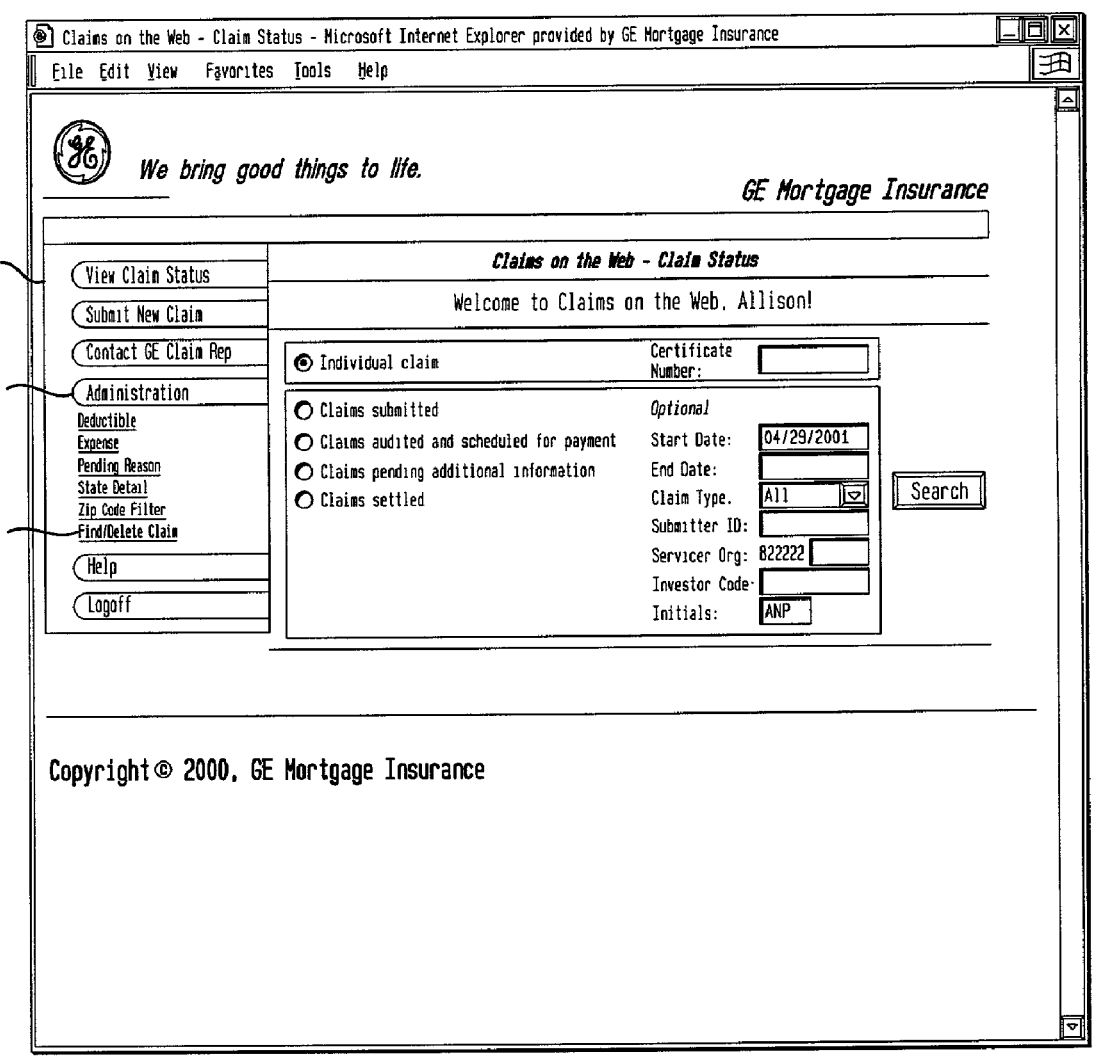
FIG. 20 shows an administration menu screen according to an aspect of the invention.

FIG. 20 shows an administration menu screen 500 according to an aspect of the invention. The administration menu screen 500 is only shown internally to a claims manager or system administrator. The administration menu screen 500 is used to maintain variables that are used in the claim audit rulebase, such as deductible items, expenses, pending reasons, state-specific data and geographic data. As shown in FIG. 20, the administration menu screen 500 includes a menu block 502 having an Administration sub-menu 504, which is used to access various administrative screens. For example, the sub-menu 504 includes a link labeled Find/Delete claim 506. The Find/Delete claim screen is used to delete claim records from the claim database when an invalid claim has been received.

Figure 21:
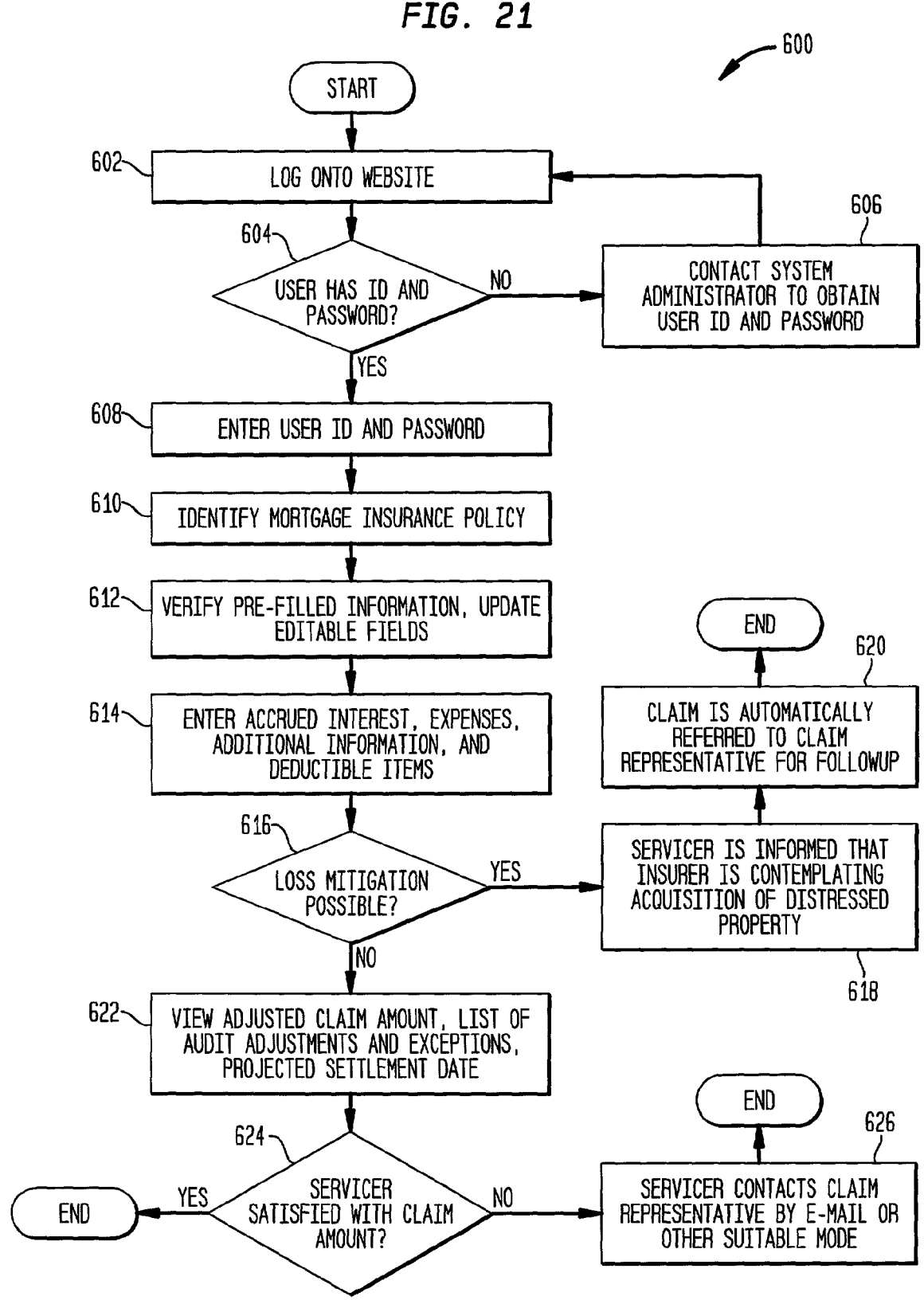
FIG. 21 shows a flowchart of a claim submission process according to an aspect of the invention.

FIG. 21 shows a flowchart illustrating a claim submission process 600 from the point of view of a servicer or other user of an automatic claim processing system according to the invention. In step 602, the servicer logs onto a website providing access to the system. In step 604, it is determined whether the servicer has a user ID and password. If not, then in step 606 the servicer contacts a system administrator to obtain an ID and password and then returns to step 602. In step 608, the servicer enters a user ID and password to gain access to the website.

Once the servicer has been properly identified to the system, then in step 610, the mortgage insurance policy and covered property are identified. In step 612, the servicer verifies information contained in pre-filled fields on a claim submission form. In step 614, the servicer inputs data into the claim submission form, including: accrued interest, expenses, additional information relating to the claim, and deductible items. In step 616, the system's claim audit rulebase determines, based upon an initial evaluation of the submitted data, whether it may be possible to mitigate loss by acquiring the distressed property. If so, then in step 618, the servicer is informed that the insurer is considering acquisition of the distressed property, and in step 620, the claim is automatically referred to a claim representative for followup.

In step 622, the servicer views the adjusted claim amount, a list of audit adjustments and exceptions, and a projected settlement date, all of which are automatically calculated and displayed by the system. In step 624, the servicer determines whether the adjusted claim amount calculated by the system is satisfactory. If not, then in step 626, the servicer contacts a claim representative by e-mail or other suitable form of communication. In addition, the servicer may elect to submit a supplemental claim if, based upon the list of audit adjustments and exceptions generated by the system, it appears that it might be productive to do so. If in step 624, the servicer is satisfied with the adjusted claim amount calculated by the system, the claim audit process is complete, and no further action is required by the servicer.

FIGS. 22A through 22C show a sample rules table 700 according to an aspect of the invention setting forth rules that may suitably be used by the claim audit rulebase 32 shown in FIG. 1. The first table column 702 lists the rules used by the rulebase. The second column 704 sets forth, for each rule, a triggering factor, or factors, that cause the rule to be invoked.

The third column 706 sets forth, for each rule, automatic logic to be used to process data when the rule has been invoked. The fourth column 708 shows a pseudo-code rendering for certain rules in the table 700.

Figure 23:
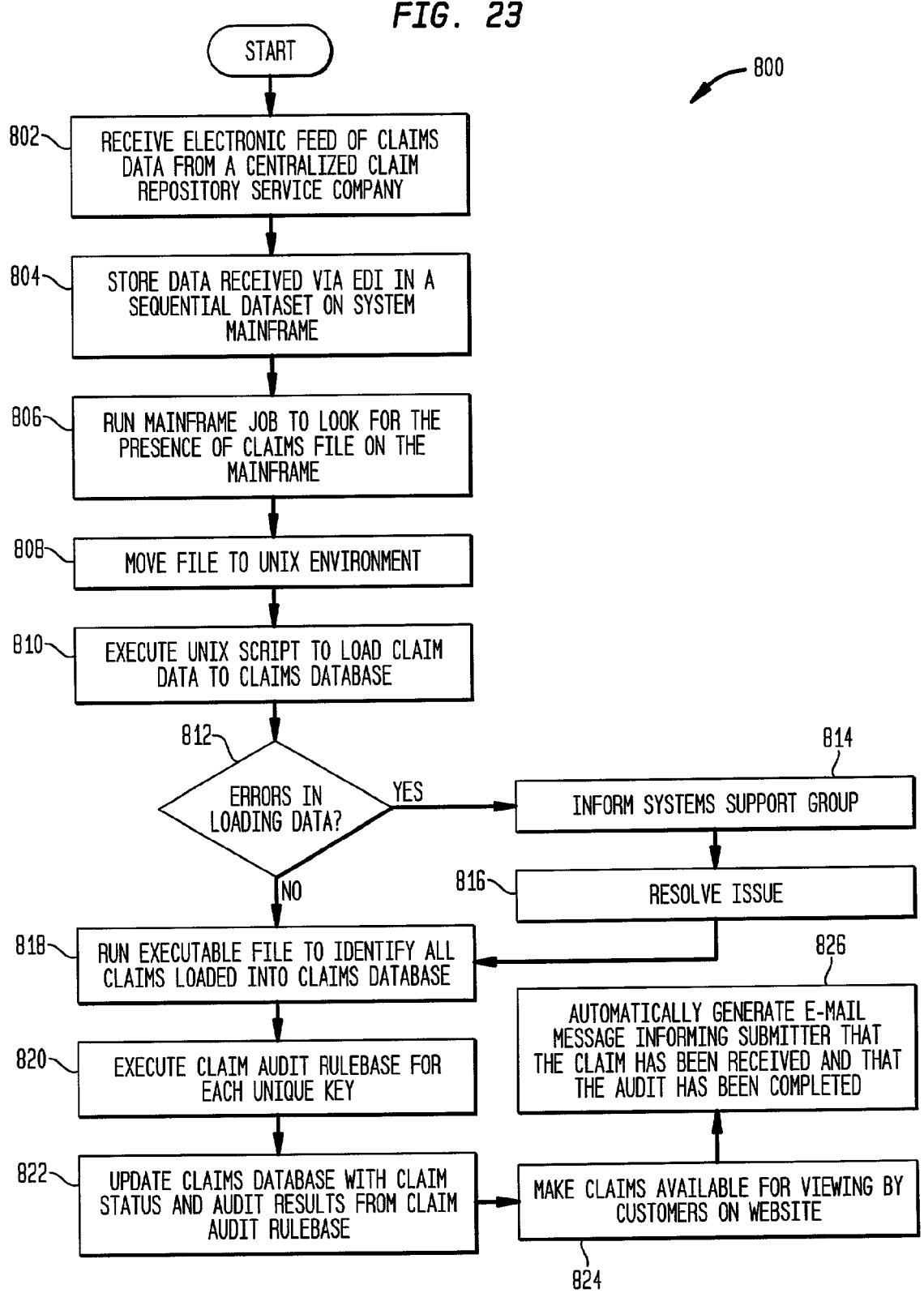
FIG. 23 shows a flowchart of a claim submission process according to an aspect of the invention, in which a claim processing system receives bulk submissions of claims.

FIG. 23 shows a flowchart of an automated claims processing method 800 according to a further aspect of the invention, in which an automated claims system, such as the system 10 illustrated in FIG. 1, receives claims submitted in bulk and without manual intervention. According to this aspect of the invention, transmission of claims files occurs on a predetermined schedule, for example, during evening hours.

In step 802, the automated claims system receives an electronic feed (EDI) of bulk claims data from a centralized claim data repository service company, such as Alltel. Each claim within the electronic feed is identified by a unique key, or other suitable identifier. In step 804, the bulk claims data received via EDI are stored in a sequential dataset in a claims file on a system mainframe computer, such as the loss mitigation mainframe system 34 shown in FIG. 1.

In step 806, a mainframe job programmed to run automatically on a regular schedule looks for the presence of the claims file on the mainframe. In step 808, the mainframe job invokes suitable software, such as Network Data Mover, to move the claims file into a local environment, such as a Unix environment. In step 810, the Network Data Mover software executes Unix script, which uses Sybase-stored procedures to load the claims data into a claims database, such as database 30 in FIG. 1.

In step 812, the system determines whether there have been any errors in loading the data into the claims database. If errors are detected, then in step 814, the errors are brought to the attention of a systems support group using e-mail. In step 816, the issues are resolved on the next business day, or at some other suitable time.

In step 818, an executable file residing on a transaction server, such as the transaction server 26 shown in FIG. 1, runs and executes a Sybase-stored procedure to identify all claims that were loaded into the claims database in step 810. The executable file is programmed to run on a regular schedule, similar to the run schedule of the mainframe job. As mentioned above, each claim is identified by a unique key. In step 820, a claim audit rulebase, such as the claim audit rulebase 32 shown in FIG. 1, is run for each unique key. In step 822, the claim audit rulebase updates the claims database with a claim status and audit results for each submitted claim. In step 824, submitted claims are made available for viewing by servicers at a system website within minutes of the claims being loaded into the claims database. Access to claim information is limited to authorized persons through the use of passwords, or other suitable security measure. In step 826, the system generates an automated e-mail message, informing the submitter when a claim has been received and an audit has been completed.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A system for automatically and rapidly submitting and processing mortgage insurance claims, comprising;
   a remote servicer terminal connected into a network, the servicer terminal capturing data related to initially submitting a mortgage insurance claim and initially submitting the mortgage insurance claim over the network to an insurer, the data further being related to an insured mortgage loan after default on the mortgage loan by a borrower;
   a claims database storing data relating to the mortgage insurance claim;
   a transaction server connected to the claims database and through the network to the remote servicer terminal to receive inputs from, and provide outputs to the remote servicer terminal, said inputs including the captured data and the mortgage insurance claim; and
   a claim audit rulebase accessed by the transaction server and causing the transaction server to retrieve data relating to the mortgage insurance claim from the claims database and for automatically performing an audit and adjustments of the submitted mortgage insurance claim, providing results of the audit and adjustments to the servicer terminal, and presenting the servicer with an option to interact with a claim representative to resolve any issues, the claim audit rulebase utilizing rules directed to determine whether loss can be mitigated by acquisition by the insurer of a property subject to the insured mortgage loan.

2. The system of claim 1, wherein the system displays at the servicer terminal a claim submission form including data entry fields for receiving claim data.

3. The system of claim 2, wherein the data entry fields include fields that are automatically pre-filled by the system using stored data.

4. The system of claim 2, wherein the claim form includes provisions for submission of all data specified by the Uniform Mortgage Insurance claim for Loss.

5. The system of claim 1, further including a document generator connected through a web server to the transaction server and receiving instructions from the transaction server for generating a settlement letter to be sent to the servicer.

6. The system of claim 1, wherein if the claim audit rulebase determines that a payment is to be made on the submitted claim, projected date of payment is provided.

7. The system of claim 1, wherein a detailed explanation of policy exceptions identified by the claim audit rulebase is provided.

8. The system of claim 1, further including:
   a claim representative terminal connected into the network for allowing a servicer to communicate with a claim representative.

9. The system of claim 8, wherein the servicer communicates with the claim representative using e-mail.

10. The system of claim 1, wherein the servicer terminal runs a web browser, and wherein the system includes a web server computer for sending web pages to the servicer terminal.

11. The system of claim 10, further including a transaction server for relaying data among the central server computer, the claim audit rulebase, and the claims database.

12. The system of claim 1, wherein the servicer terminal captures data relating to the value of a property securing the insured mortgage loan.

13. The system of claim 1, wherein the servicer terminal captures data relating to unpaid interest due and expenses incurred as a result of default by a borrower.

14. A system for automatically processing mortgage insurance claims, comprising:

a web server administering a network of servicer terminals connected into a network, each servicer terminal running web browser software for viewing web pages served by the web server, the web pages including a claim submission form for receiving a mortgage insurance claim including submission data submitted at a servicer terminal, the claim submission data being related to an insured mortgage loan on a property after default on the mortgage loan by a borrower; and a transaction server connected through the web server and the network to the network of servicer terminals, the transaction server accessing a claim audit rulebase and a claims database to retrieve data relating to the mortgage insurance claim and to automatically perform an audit and adjustment for the mortgage insurance claim and to automatically provide results of the audit and adjustment to the servicer terminal, the claim audit rulebase utilizing rules directed to determine whether loss can be mitigated by acquisition of the property by an insurer.

15. The system of claim 14, further including:
a document generator connected to the transaction server through the web server and receiving instructions from the transaction server for generating a settlement letter.

16. The system of claim 14, further including:
a network of claim representative terminals connected to the web server for allowing at a servicer terminal to communicate with a claim representative terminal.

17. A method for automatically processing mortgage insurance claims, comprising:
(a) capturing at a servicer terminal data relating to initial submission of a mortgage insurance claim, the servicer terminal being connected into a network administered by a central server computer and transmitting the mortgage insurance claim over the network to the transaction server, capturing of data including capturing data relating to an insured mortgage loan after default on the mortgage loan by a borrower;
(b) utilizing the central server to automatically retrieve from a claims database, connected into the network, data relating to the mortgage insurance claim;
(c) utilizing the central server to access a claim audit rulebase and to automatically perform an audit and adjustment of the submitted claim based upon the data captured at the servicer terminal and the data retrieved from the claims database, the claim audit rulebase utilizing rules directed to determining if loss can be mitigated by acquisition by an insurer of a property subject to the insured mortgage loan;
(d) automatically providing to the servicer terminal results of the audit and adjustments of the submitted claim; and
(e) automatically displaying at the servicer terminal an option to interact with a claim representative to resolve any issues.

18. The method of claim 17, wherein step (a) includes:
displaying at the servicer terminal a claim submission form including data entry fields for receiving claim data.

19. The method of claim 18, wherein step (a) further includes:
automatically pre-filling data entry fields using stored data.

20. The method of claim 17, further including the following steps:
(f) receiving instructions from the transaction server for generating a settlement letter by a document generator; and
(g) generating a settlement letter to be sent to the servicer by the document generator.

21. The method of claim 17, wherein step (e) includes:
providing a projected date of payment if a calculated claim amount determined by the transaction server is accepted.

22. The method of claim 17, wherein the claim audit rule base includes policy exceptions and rules for identifying policy exceptions applicable to the mortgage insurance claim, and step (d) includes:
providing a detailed explanation of policy exceptions identified by the claim audit rulebase.

23. The method of claim 17, further including:
providing a network connection between the servicer terminal and a claim representative terminal to allow a servicer to communicate with a claim representative.

24. The method of claim 23, further including:
providing a network connection between the servicer terminal and a claim representative terminal to allow a servicer to communicate with a claim representative using e-mail.

25. The method of claim 17, wherein step (a) includes:
providing the servicer terminal with a web browser and sending web pages to the servicer terminal.

26. The method of claim 17, further including:
using a transaction server for relaying data among the central server computer, the claim audit rulebase, and the claims database.

27. A method for automatically processing mortgage insurance claims, comprising:
(a) using a web server to administer a network of servicer terminals, each servicer terminal in the network running web browser software for viewing web pages served by the web server,
(b) sending a web page from the web server to the servicer terminal, the web page including a claim submission form providing for direct entry of inputs relating to the mortgage insurance claim for an insured mortgage loan after default on the mortgage loan by a borrower, capturing claim submission data at the servicer terminal, and initially submitting the claim submission form;
(c) utilizing a transaction server to access a claim audit rulebase and a claims database to automatically perform an audit and adjustment of the mortgage insurance claim submitted at the servicer terminal, the claim audit rulebase utilizing rules directed to determining if loss can be mitigated by acquisition by an insurer of a property subject to the insured mortgage loan; and
(d) automatically providing results of the audit and adjustment over the network to the servicer terminal.

28. The method of claim 27, further including the following step (e):
(e) generating a settlement letter.

29. The method of claim 27, further including:
connecting a network of claim representative terminals to the web server to allow a servicer terminal to communicate with a claim representative terminal.

30. A method for automatically processing mortgage insurance claims, comprising:
(a) receiving an electronic feed of claims data from a centralized claim repository service company, the claims data relating to insured mortgage loans after default on each mortgage loan by a borrower;
(b) storing the received data in a sequential dataset in a claims file on a system mainframe;
(c) running a mainframe job to look for the claims file on the mainframe;
(d) loading data from the claims file into a claims database;
(e) identifying all claims loaded into the claims database;

(f) executing a claim audit rulebase for each identified claim by a transaction server and causing the transaction server to retrieve data relating to each identified claim, execution of the claim audit rulebase including executing rules directed to determining if loss can be mitigated by acquisition by an insurer of a property subject to an insured mortgage loan that is the subject of the claim;
(g) updating the claims database with claim status and audit results from the claim audit rulebase;
(h) making claims available for viewing by servicers on a website.

31. The method of claim 30, wherein step (d) includes:

determining whether there have been any errors in loading the claims into the claims database, and, if there are errors, informing a system support group.

32. The method of claim 30, further including:

(i) automatically generating an e-mail message informing a claim submitter that a claim has been received and that an audit has been completed.

\* \* \* \* \*